(12) United States Patent
Weidlich

(10) Patent No.: US 6,643,054 B1
(45) Date of Patent: Nov. 4, 2003

(54) BEAM DEFLECTOR, SWITCHING SYSTEM COMPRISING BEAM DEFLECTORS AS WELL AS METHOD FOR SELECTIVELY COUPLING TERMINALS FOR OPTICAL SIGNALS

(75) Inventor: Kai Weidlich, Aalen (DE)

(73) Assignee: Carl-Zeiss-Stiftung (DE)

( * ) Notice: Subject to any disclaimer, the term of this patent is extended or adjusted under 35 U.S.C. 154(b) by 0 days.

(21) Appl. No.: 10/054,698

(22) Filed: Jan. 22, 2002

Related U.S. Application Data
(60) Provisional application No. 60/263,353, filed on Jan. 22, 2001.

(30) Foreign Application Priority Data
Jan. 22, 2001 (DE) .......................................... 101 02 723

(51) Int. Cl.[7] ................................ G02F 1/29; G02F 1/07
(52) U.S. Cl. ...................... 359/298; 359/260; 359/318
(58) Field of Search .......................... 359/315, 318, 359/320, 298, 260, 261, 263

(56) References Cited

U.S. PATENT DOCUMENTS

| | | | |
|---|---|---|---|
| 3,787,111 A | 1/1974 | Giordmaine et al. | 359/315 |
| 4,525,687 A | 6/1985 | Chemla et al. | 359/276 |
| 4,573,767 A | 3/1986 | Jewell | 359/243 |
| 4,585,301 A | 4/1986 | Bialkowski | 359/243 |
| 4,639,091 A | 1/1987 | Huignard et al. | 349/202 |
| 4,790,635 A * | 12/1988 | Apsley | 359/260 |
| 4,947,223 A | 8/1990 | Biefeld et al. | 257/21 |
| 5,018,835 A | 5/1991 | Dorschner | 349/140 |
| 5,037,169 A | 8/1991 | Chun | 385/16 |
| 5,093,740 A | 3/1992 | Dorschner et al. | 349/202 |
| 5,093,747 A | 3/1992 | Dorschner | 359/316 |
| 5,126,869 A | 6/1992 | Lipchak et al. | 349/202 |
| 5,150,236 A * | 9/1992 | Patel | 349/198 |
| 5,151,814 A | 9/1992 | Grinberg et al. | 359/209 |
| 5,168,383 A * | 12/1992 | Iwaki et al. | 349/198 |
| 5,319,492 A | 6/1994 | Dorn et al. | 359/296 |
| 5,321,774 A | 6/1994 | Barnard et al. | 385/16 |
| 5,734,503 A | 3/1998 | Szipocs et al. | 359/584 |
| 5,909,303 A | 6/1999 | Trezza et al. | 359/248 |
| 5,959,756 A | 9/1999 | Keyworth et al. | 359/196 |
| 5,963,682 A | 10/1999 | Dorschner et al. | 385/16 |
| 6,081,379 A | 6/2000 | Austin et al. | 359/584 |
| 6,081,634 A | 6/2000 | Attard | 385/16 |
| 6,154,318 A | 11/2000 | Austin et al. | 359/584 |
| 6,211,993 B1 * | 4/2001 | Wang et al. | 359/260 |
| 6,215,592 B1 * | 4/2001 | Pelekhaty | 359/618 |

OTHER PUBLICATIONS

"Few–Cycle Light: Challenges and Prospects" Printed from the internet, at http://tuwien.ac.at/photonik/home/Krausz/Research.htm on Jan. 15, 2001, 19 pages.

(List continued on next page.)

*Primary Examiner*—Loha Ben
*Assistant Examiner*—William Choi
(74) *Attorney, Agent, or Firm*—Rosenthal & Osha L.L.P.

(57) ABSTRACT

A beam deflector 1 for a beam of light 9 comprises: a first plate of electro-optical material disposed between a pair of electrode arrangements and a pair of plano-parallel mirrors, the refractive index of the electro-optical material being variable by the application of electric voltages, wherein a first mirror of the pair facing towards the incident light has a lower reflectivity than the second mirror, the first or second mirrors comprising a plurality of dielectric layers having refractive indices different from each other.

Further, a switching system comprises: a plurality of terminals (53) for optical signals and beam deflectors (1) allocated to each other in pairs, each beam deflector being controllable such that it deflects the light beam (9) directed thereto into a selectable direction in order for the beam to enter at least one selected terminal end (55).

21 Claims, 14 Drawing Sheets

OTHER PUBLICATIONS

Lewotskey, Kristin, "News & Analysis @ Photonics Online: Digital Marketplace for the Photonics Industry; MEMS Technology Grabsthe TelecomSpotlight", Printed fromthe internetat http://www.photonic . . . /article.asp?DocID={36B371A9–11D4–8C37–009027DE0829,n Oct.

B.H. Lee et al., "Demonstration of a Very Low–Loss, 576×576 Servo–Controlled, Beam–Steering Optical Switch Fabric", Bell Laboratories Lucent Technologies, ECOC 2000, 2 pages.

Timothy Murphy et al., "A Strictly Non–Blocking 16×16 Eketctrooptic Photonic Switch Module", Bell Laboratories Lucent Technologies, ECOC 2000, 2 pages.

* cited by examiner

BEAM DEFLECTOR, SWITCHING SYSTEM COMPRISING BEAM DEFLECTORS AS WELL AS METHOD FOR SELECTIVELY COUPLING TERMINALS FOR OPTICAL SIGNALS

This application claims the benefit of U.S. Provisional Application No. 60/263,353 filed Jan. 22, 2001.

BACKGROUND OF THE INVENTION

The invention relates to a beam deflector for deflecting a beam of light into a selectable direction, and to a switching system comprising a plurality of terminals for optical signals in order for optical signals entering the switching system through one or more terminals to be output at selectable other terminals. In particular, the invention also relates to a switching system for data communication systems with fiber-optical switching systems. Furthermore, the invention relates to a method for operating such a switching system, in particular for a fiber-optical switching system.

From B. H. Lee and R. J. Capik "Demonstration of a very low-loss 576×576 servo-controlled, beam-steering optical switch fabric", a beam-steering switch is known which enables a plurality of fiber-optical inputs to be selectively coupled with a plurality of fiber-optical outputs. To this end, each optical input comprises a collimator which is adjustable by servo-control such that a light beam exiting at one terminal end of the input impinges upon a terminal end of the selected optical exit and enters the same. The servo-controlled adjustment of the plurality of collimators is mechanically complex and a desired reduction of switching time is difficult.

SUMMARY OF THE INVENTION

U.S. Pat. No. 5,963,682 discloses a switching system for selectively optically coupling optical inputs with optical outputs, wherein beam directions are not adjustable by servo-control, but by means of liquid crystal cells and the application of specific voltage and field patterns to the same. The electro-optical effect of the liquid crystals used for this purpose is sufficient to attain, by the application of electric field patterns, adequate deflection angles for selectively driving several outputs. However, in this prior art system, the inertance of the liquid crystal limits an attainable switching speed and, moreover, losses of optical intensity which occur when the optical signals pass through the switching system are felt to be too high.

U.S. Pat. No. 5,319,492 discloses an optical switch, wherein an optical polymer which is non-linear in the second order is enclosed in a cavity, to which polymer a spatially changing electric field can be applied by means of structured electrodes in order to produce a switchable reflection grating, because the refractive index of the polymer can be spatially varied by the application of the electric field. As the cavity is mirrored, the achievable deflection angle is increased, because an incident light beam circulates several times in the cavity. However, when the light beam circulates several times in the resonator, the intrinsic absorption of the polymer material results into significant intensity losses, so that an increase of the deflection angle is limited by the absorption of the medium in the cavity.

It is one object of the present invention to provide a beam deflector for deflecting an incident light beam which is improved in particular in respect of attainable deflection angles or/and switching times.

Moreover, it is an object of the invention to provide a beam deflector which is better suited for use in optical data communication systems.

In addition, it is an object of the present invention to provide a switching system comprising a plurality of terminals for optical signals which is in particular suitable to be employed in optical data communications systems with high transmission rates and short switch-over times.

Furthermore, it is an object of the invention to provide a switching system comprising several terminals for optical signals which enables comparatively little losses of optical intensity to be achieved.

According to a first aspect, the invention proceeds from a beam deflector which comprises a plate of electro-optical material disposed between plano-parallel mirrors, the reflective index of said electro-optical material being spatially changeable by the application of an electric field pattern in the direction of extension of the plate. The reflectivity of the mirror of the pair of mirrors facing towards the incident light beam is less than that of the other mirror of the pair of mirrors. As a result, the intensity of the incident light beam reflected by the beam deflector is higher than the intensity of the incident light beam transmitted by the beam deflector.

In this respect, the invention is distinguished in that the first or/and the second mirror comprises a plurality of layers of dielectric material, the refractive indices of which are different from each other from layer to layer.

The invention is based on the concept that the electro-optical material is disposed in a high-quality resonator, so that the number of circulations which parts of the incident light beam perform in the resonator before they exit is particularly high. This high quality of the resonator is achieved by the use of mirrors having a high reflectivity and a low residual transmisssivity, respectively. This is achieved by the use of multi-layer mirrors of dielectric materials having different refractive powers. The high quality of the resonator and, as a result, the high number of circulations of the beam to be deflected intensifies the effect of the electro-optical material, so that, on the one hand, the deflection angles achievable with this material is increased as compared to a material which is passed through only once or only a couple of times. On the other hand, it is possible, at a given deflection angle, to reduce the thickness of the electro-optical material as compared to a system with lower resonator quality. As a result, it is possible to reduce the electric fields to be applied and the switching times, in particular when the electro-optical material is a liquid crystal.

Moreover, it is possible to employ in a high-quality resonator also electro-optical materials which have a relatively low electro-optical effect as compared to the known liquid crystals, but can be switched much quicker.

Preferably, the beam deflector is provided for deflecting light having optical wavelengths, preferably light in a wavelength range of from 0.5 $\mu$m to 3.0 $\mu$m, more preferred, in a wavelength range of from 1.0 $\mu$m to 2.0 $\mu$m and, particularly preferred, in a wavelength range of from 1.3 $\mu$m to 1.7 $\mu$m.

Preferably, electro-optical solid materials are used, preferably lithium niobate (LiNbO$_3$) or/and gallium arsenide (GaAs).

In order to increase the reflectivity of the mirrors, and thus the quality of the resonator, preferably, several layers of the dielectric materials have a thickness which corresponds substantially to a value d which satisfies the equation d=$\lambda$/4, wherein $\lambda$ is the wavelength of the light of the incident beam in the dielectric material of the layer. As a result, the partial beams of the incident light beam reflected at a front boundary surface and a rear boundary surface of a layer of such a thickness d interfere with each other in constructive manner, whereas partial beams transmitted through the layers interfere with each other in destructive manner.

Further, in order to increase the resonator quality, the plate of electro-optical material has a thickness which corresponds substantially to a value D which satisfies one of the two formulae $D=k/2*\lambda$ and $D=(2k-1)/4*\lambda$, wherein $\lambda$ is the wavelength of the incident beam in the electro-optical material and k is a natural number of more than 0. The first or second one of the equations is selected depending on whether the layers adjacent to the electro-optical material have a higher or lower refractive index than the electro-optical material itself and whether the structure of the mirror layer stack adjacent to the plate of electro-optical material is symmetrical or unsymmetrical in respect of the plate.

A simple configuration of the mirror is obtained if the mirror layers are made of merely two different dielectric materials which are alternately laminated onto one another. The refractive indices of the two mirror materials should differ from each other as much as possible. Preferably, silicon dioxide ($SiO_2$) and titanium oxide (TiO) are employed as such mirror materials. Preferred materials are also gallium arsenide (GaAs) and aluminium arsenide (AlAs) or aluminium gallium arsenide (AlGaAs).

In order for the intensity of the deflected light beam to be as high as possible, the mirror of the resonator facing away from the incident light beam is substantially fully reflective. The mirror facing towards the incident beam could be provided likewise substantially fully reflective to further increase the resonator quality. However, this mirror has a residual transmissivity which is more than five times, in particular, more than ten times the residual transmissivity of the mirror facing away from the incident light beam.

Preferably, the beam deflector comprises a second plate of electro-optical material which, viewed in the direction of the incident beam, is disposed behind the second mirror and arranged in a further resonator formed by the second mirror and a third mirror which is disposed plano-parallel thereto.

Preferably, said second resonator is of a higher quality than the first resonator disposed above the former, viewed from the incident beam. Preferably, this is achieved in that the third mirror has a still higher reflectivity than the second mirror. Preferably, here, too, the residual transmissivity of the third mirror is five times, in particular, ten times less than the residual transmissivity of the second mirror. The high quality of the second resonator is preferably achieved by similar means as referred to above in respect of the first resonator, the number of mirror layers between which the second plate of electro-optical material is disposed, however, being higher.

If, by means of the electrode arrangements which are spatially structured in the plane of the mirrors, electric fields are applied to the electro-optical materials, which electric fields change in plate direction, the refractive index of the electro-optical material changes in plate direction, which results into a locally changing phase position between the incident beam and the beam emerging from the resonator. With appropriately structured electrodes and appropriate voltages applied thereto, the beam deflector may thus have the effect of a phase grating which changes the direction of the beam emerging from the beam deflector in respect of the incident light beam. By changing the voltage pattern applied, the direction of the light beam emerging from the beam deflector can then be freely varied in certain ranges.

In order to change the direction of the deflected light beam in two spatial directions, each electrode arrangement is comprised of a plurality of parallel, juxtaposed stripe electrodes, the directions of extension of the stripes of the two electrode arrangements extending transversely, and in particular orthogonally, to each other. Here, the electro-optical material is provided between the two electrode arrangements.

Such a configuration is disadvantageous in respect of the manufacture of the beam deflector in that a spatially structured electrode arrangement must be manufactured and contacted on both sides of the plate of electro-optical material.

According to a further aspect, the invention proceeds from a beam deflector for deflecting a beam of light into two spatial directions, comprising a plate of electro-optical material disposed between a pair of electrode arrangements and a pair of plano-parallel mirrors, the invention according to this aspect being distinguished in that merely one of the two electrode arrangements being spatially structured in plate direction and the other electrode arrangement covering substantially the entire area of the electro-optical material effective for the incident light beam.

Here, the structured electrode arrangement comprises preferably two sets of stripe electrodes, the stripe electrodes of each set being juxtaposed in parallel to each other and the directions of extension of the stripe electrodes of different sets extending at an angle relative to one another, in particular orthogonally, to each other.

In order to be able to produce electric fields independently of each other in the electro-optical material by menas of the two sets of electrodes, each one of the two sets of electrodes comprises active areas which, projected to the mirror plane, are juxtaposed. Active areas of the electrode sets are those areas where the electrodes of the electrode sets do substantially not shield each other and thus act on the electro-optical material.

In the configuration where the electrode sets are provided as stripe electrodes, preferably, the stripes comprise in longitudinal direction, alternately, wide and narrow active areas, the stripe electrodes of different sets intersectingly overlapping each other with their narrow areas. At least in the areas of intersection, the intersecting electrodes are electrically insulated from each other.

According to a further aspect, the invention proceeds from a switching system for selectively coupling a plurality of optical inputs with a plurality of optical outputs, wherein a plurality of terminals comprising terminal ends for the optical signals to emerge from or/and to enter as light beams is provided, and the terminal ends are disposed spaced apart from each other at predetermined positions and, furthermore, a plurality of beam deflectors is provided such that a separate beam deflector is allocated to each terminal end and the light beam exiting from the terminal end allocated to the beam deflector is directed to the same, and said beam deflector can be driven such that at least a part of the light beam directed thereto is directed into a selectable direction in order to enter, possibly after further deflections, at least one selected terminal end.

In this respect, the invention is distinguished in that the beam deflector operates in reflection, i.e., the light beam directed to the beam deflector substantially does not transmit the beam deflector, but rather, the major part of the light beam directed to the beam deflector is returned or reflected by the same.

As compared to the conventional beam deflector operating in transmission, wherein an intensity of the transmitted effective beam is reduced due to reflection losses which are on principle unavoidable, the system according to the invention is distinguished in that substantially the entire intensity of the incident light beam is available to the beam deflector also as effective beam after the desired deflection.

Advantageously, the switching system comprises at least one mirror which is arranged such that a light beam emerging from any predetermined terminal end can be directed by the beam deflector allocated to said terminal end to the mirror such that said mirror directs said beam to a further beam deflector which is allocated to the selected terminal end. This configuration enables the light beams to impinge with substantially optimal orientation on the terminal end which they are to enter. As a result, feed-in losses and thus transmission losses are considerably reduced in the switching system.

A particularly simple configuration of the beam deflection via the mirror is attained if effective mirror surfaces of said mirror are positioned in spaces between adjacent terminal ends or between the light beams emerging from and entering the same, respectively.

In order to reduce an overall length of the switching system, at a given maximum deflection angle of the beam deflector and a given distance of the terminal ends to be driven by the beam deflector, preferably, a telescope is positioned between the terminal ends and the beam deflector, said telescope comprising at least one objective lens through which all beams emerging from and entering terminal ends extend. The telescope may be a keplerian telescope, a galilean telescope or any other type of telescope.

Furthermore, it is advantageous to provide a separate telescope for each beam deflector in order for a beam diameter of the beam emerging from the exit end, optionally after collimation, to be adjusted as optimally as possible to an effective diameter of the beam deflector.

For the purpose of distinction, the above-described telescope through which all beams extend is referred to hereinbelow as common telescope, whereas the plurality of telescopes, which are allocated individually to the beam deflectors are referred to hereinbelow as individual telescopes.

Another essential, though not inevitable, aspect of the invention resides in that to provide lateral dimensions of the beam deflectors larger than this would be actually necessary in terms of manufacturing engineering. In particular, a distance b in the plane of the plate of electro-optical material along which the beam deflector can provide a phase shift of the reflected light of $2\pi$ should not be selected to be smaller than is indicated by the formula $$b > \lambda * \sqrt{\left(\frac{5}{2} * \frac{1}{(n * \Delta n)}\right)}$$

If this dimensioning rule is observed, crosstalk from one output channel to another output channel is largely avoided.

This aspect is particularly embodied in a switching system, wherein a distance between adjacent terminal ends is smaller than a distance between adjacent beam deflectors. In terms of manufacturing engineering, for example, the structure of the structured electrode arrangement could be further reduced in size, in order to adjust the distance between adjacent beam deflectors to the distance between adjacent terminal ends. However, in order to reduce crosstalk between different output channels, the distance between adjacent beam deflectors is selected to be larger than it would be necessary in terms of manufacturing engineering. However, the distance between adjacent terminal ends is then not adjusted to the distance between the adjacent beam deflectors, but the distance between adjacent terminal ends is reduced in order to reduce a maximally required deflection angle of the beam deflectors and, thus, the overall length of the switching system.

BRIEF DESCRIPTION OF THE DRAWINGS

Embodiments of the invention are described in further detail hereinbelow with reference to the accompanying drawings, wherein.

DETAILED DESCRIPTION

A first embodiment of a beam deflector 1 according to the invention is described with reference to FIGS. 1 to 4.

The structure of the beam deflector 1 is that of an optical resonator or etalon, wherein a plate 3 of electro-optical material is arranged between two plano-parallel mirrors 5 and 7. As referred to herein, an electro-optical material is any material which has a distinct, i.e., technically utilizable, electro-optical effect, i.e., a refractive index n of the electro-optical material is variable by applying an electric field to said material. To this end, it is in particular the so-called linear electro-optical effect of the applied electric field strength which is of interest here.

The electro-optical material selected for this embodiment is lithium niobate ($LiNbO_3$), for which a refractive index of n=2.3 is assumed, said reflective index being variable by $\Delta n = 5*10^{-4}$ by the application of a suitable electric voltage of about 400 Volt to electrodes arranged at a distance from each other of 100 μm.

Figure 1:
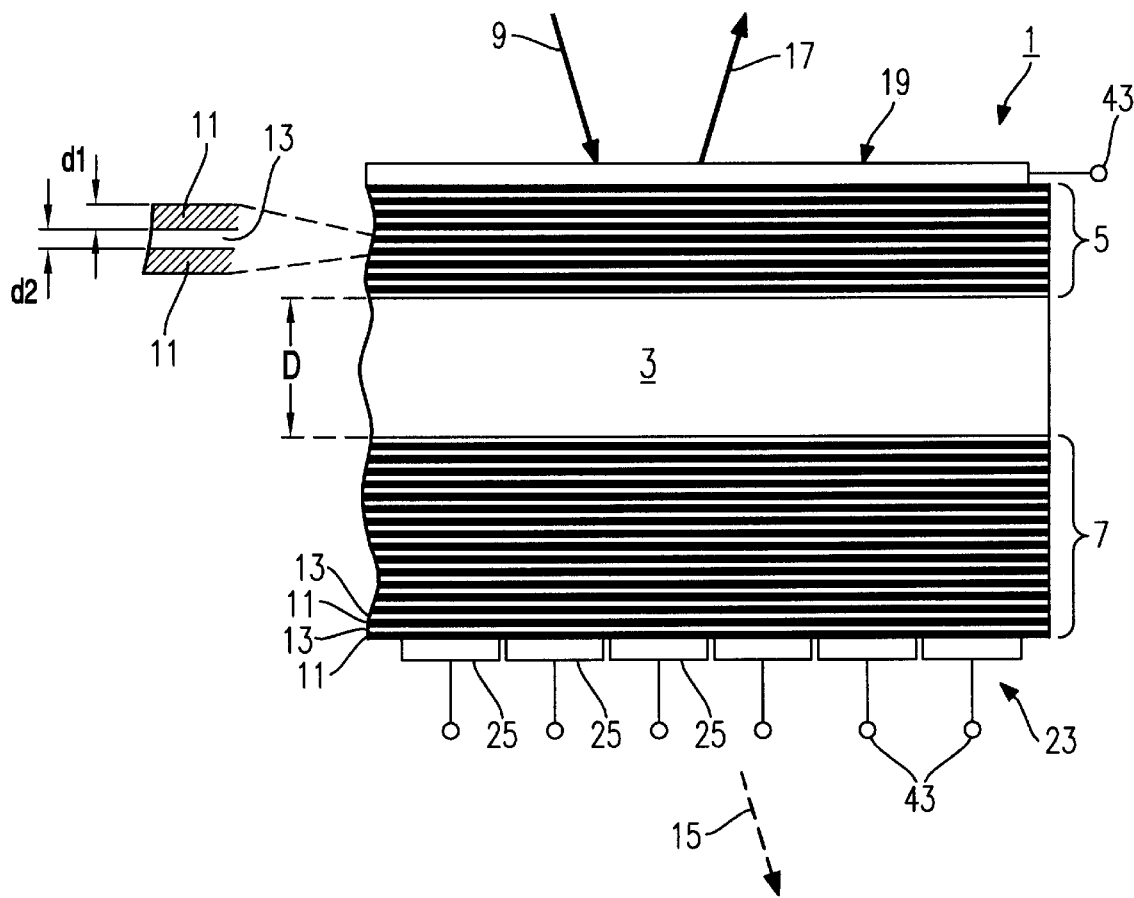
FIG. 1 is a cut schematic partial view of an embodiment of a beam deflector according to the invention.

Of the two mirrors 5, 7, between which the plate 3 of electro-optical material is embedded, the upper mirror 5 of FIG. 1 facing towards an incident light beam 9 has a lower reflectivity than the lower mirror 7 facing away from the light beam in respect of the plate 3.

Each mirror 5, 7 is highly reflective and provided with low self-absorption in that a plurality of layers 11, 13 of dielectric material with different refractive indices are alternately laminated onto each other. In the present embodiment, titanium oxide (TiO), for which a refractive index $n_H$=2.20 is assumed, is used as material for the layers 11 with a high refractive index and Silicon oxide ($SiO_2$), for which a refractive index $n_L$=1.48 is assumed, is used for the layers 13 with a low refractive index.

The number of alternately arranged layers 11, 13 of the upper mirror 5 is smaller than the number of layers 11, 13 which the lower mirror 7 is comprised of, so that the lower mirror 7 has a higher reflectivity than the upper mirror 5. In particular, the residual transmissivities of the two mirrors 5, 7 differ so strongly from each other that merely a minimum intensity proportion 15 of the incident beam 9 passes through the etalon 1 in transmission and the major intensity of the deflected beam 17 is reflected by the etalon 1.

In respect of the high quality of the resonator, the layers 11, 13 of dielectric material have a thickness d1 and d2, respectively, which corresponds to a fourth of the wavelength $\lambda$ of the incident beam 9 in the respective dielectric material of the layer.

Equally, in respect of the high quality of the resonator, a thickness D of the plate 3 of electro-optical material is adjusted to the wavelength $\lambda$ of the incident beam 9 in the electro-optical material. Preferably, the thickness D satisfies one of the formulae $D=k/2*\lambda$ and $D=(2k-1)/4*\lambda$, wherein $\lambda$ is the wavelength of the incident beam in the electro-optical material and k is a natural number of more than 0. In this respect, one of the two formulae is selected such that partial beams which repeatedly circulate in the resonator formed by the mirrors 5 and 7 interfere with each other in a constructive manner.

Electric fields can be applied, position-dependent, to the electro-optical material 3 by means of two spatially structured electrode arrangements in order to change, position-dependent, the refractive index n of the electro-optical material 3. An upper electrode arrangement 19 is disposed on the upper mirror 5 and comprises a plurality of parallel and spaced apart stripe electrodes 21. The second electrode arrangement 23 is mounted to the lower mirror 7 below the same and likewise comprises a plurality of parallel and spaced apart stripe electrodes 25 (see FIG. 4). The directions of extension of the stripe electrodes 21 and 25, in projection to the plane of the plano-parallel mirrors 5, 7, extend orthogonally to each other in order for the deflected beam 17 to be deflected into two spatial directions by means of the beam deflector 1, as it is described hereinbelow.

First, be it assumed that a substantially homogeneous electric field is applied to the entire plate 3 of electro-optical material via the electrode arrangements 19 and 23 in order to change the refractive index of the electro-optical material.

Since, as described above, substantially the entire intensity of the incident beam 9 is reflected into the exiting beam 17, the reflectivity of the etalon 1, when being examined dependent upon the wavelength $\lambda$, deviates only slightly from a 100% reflectivity R.

Figure 2:
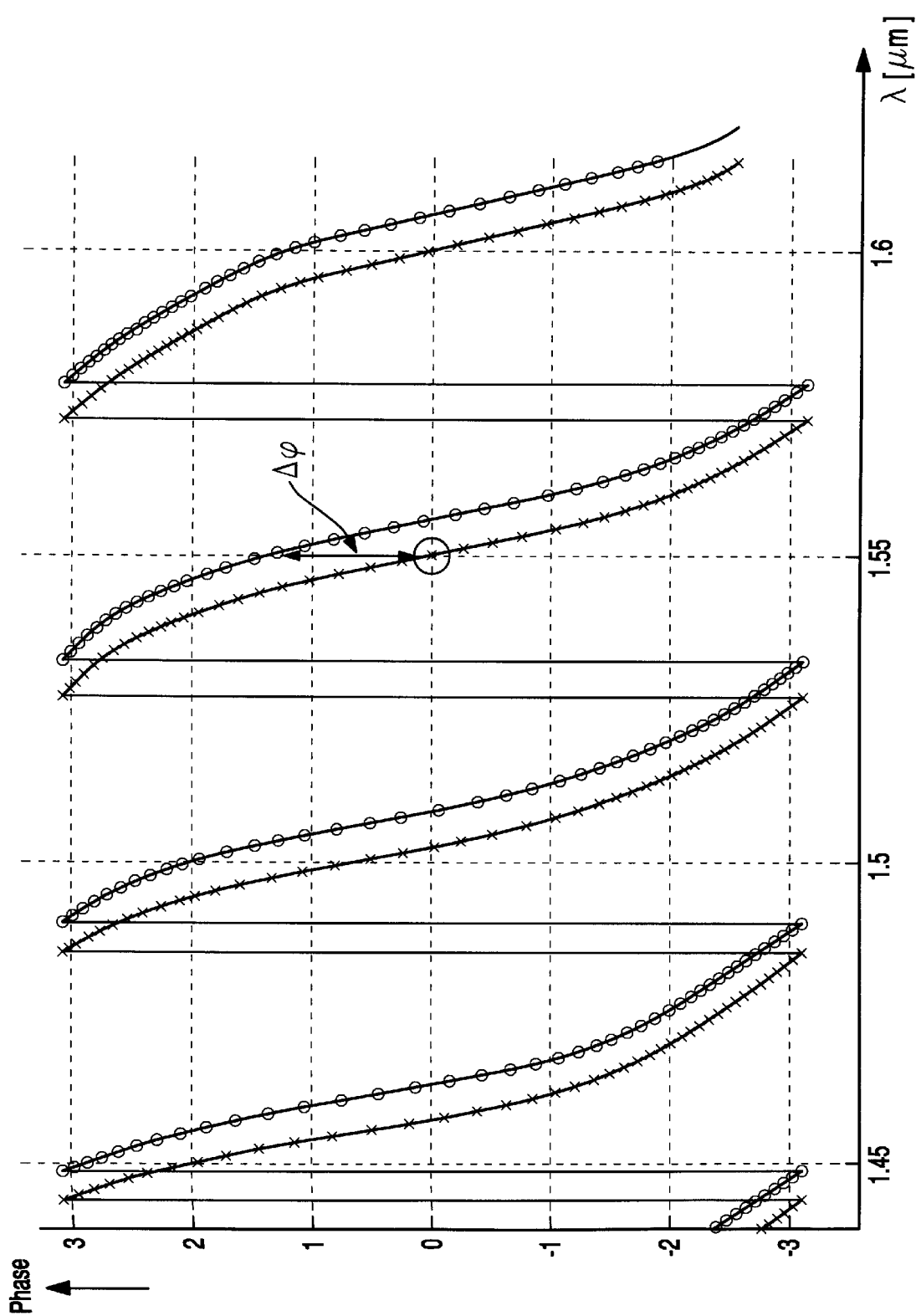
FIG. 2 is a graphical representation of a phase curve of a beam reflected at the beam deflector dependent upon a wavelength of an incident beam of light.

This is different if the phase position of the reflected beam 17 is examined in respect of the incident beam 9 dependent upon the wavelength $\lambda$ of the incident beam 9. A graphical representation of these phase curves is shown in FIG. 2, wherein the points represented by the letter X indicate the phase curve when the electro-optical material it is not subjected to an electric field, and wherein points represented by circles indicate the phase curve when the refractive index of the electro-optical material 3 is increased by the application of a correspondingly selected field from n=2.30 to n+$\Delta$n=2.31. (For a better understanding, a value of 0.01 was selected for $\Delta$n. In practice, lower values are applied so that comparatively low voltages are sufficient to produce the required electric field strength.)

The depicted phase curve is obtained if four double-layers of silicon oxide and titanium oxide are employed for the upper mirror 5, each having a thickness $d1=d2=\lambda/4$, if the lower mirror 7 is comprised of 16 double-layers of silicon oxide and titanium oxide, each having a thickness of $d1=d2=\lambda/4$ and if the plate of electro-optical material has a thickness $D=14.5\lambda$.

The beam deflector is provided in respect of a predetermined wavelength (design quality) $\lambda_0=1.55$ $\mu$m such that, when no electric field is applied, the phase difference between incident beam 9 and reflected beam 17 is 0. If an electric field is applied such that the refractive index of the electro-optical material 3 changes by $\Delta n=0.01$ at this wavelength $\lambda_0$, a phase difference of about 1.4 is produced between incident and reflected wave, as it is evident from FIG. 2. If stronger electric fields are applied, also larger phase differences $\Delta\phi$ can be produced. In all, with the described etalon 1, it is possible to freely adjust the phase relation between the incident beam 9 and the exiting beam 17 at the design quality $\lambda_0$, over a full period of from $-\pi$ to $+\pi$.

Figure 3:
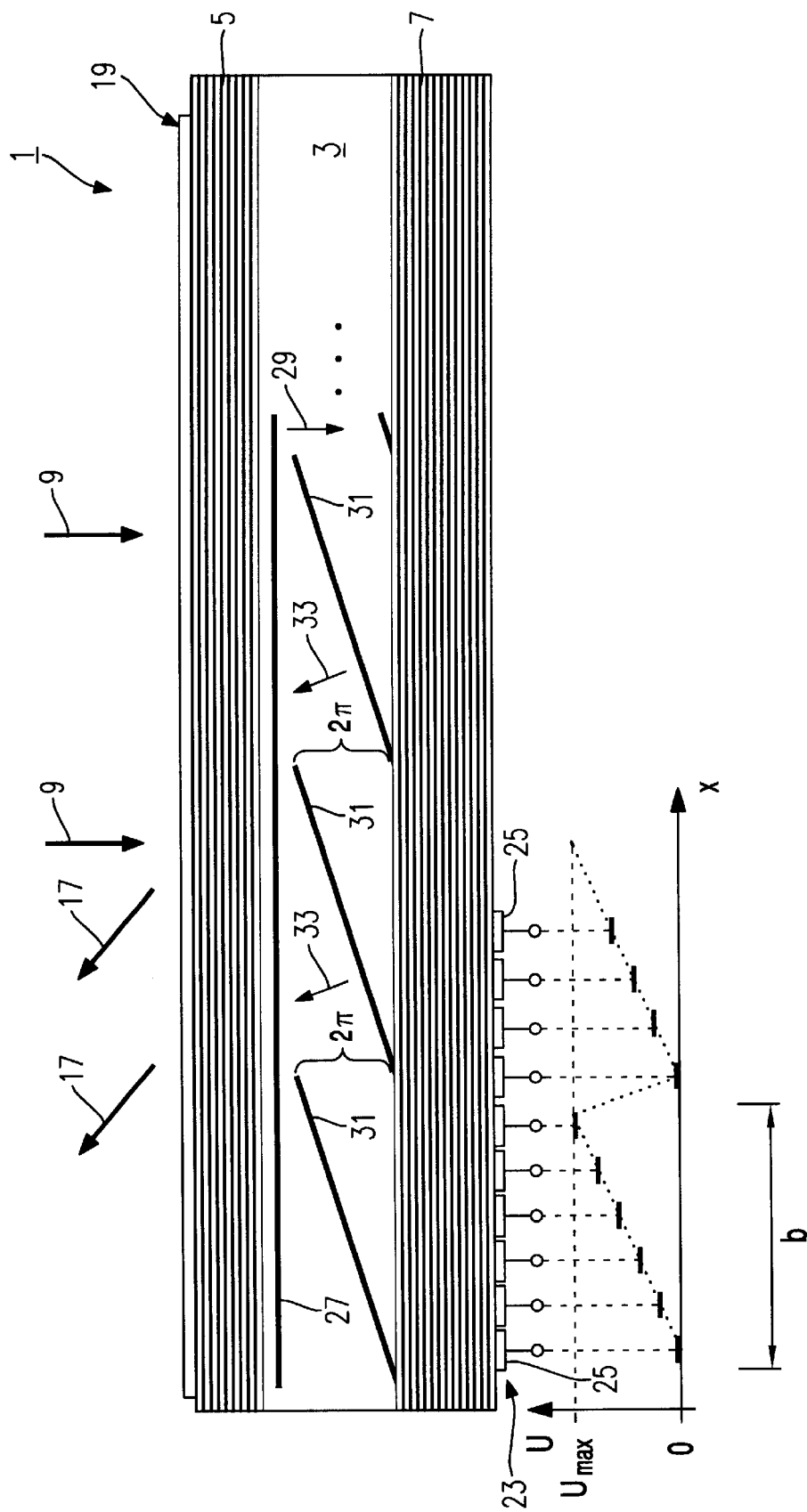
FIG. 3 is a schematic representation illustrating a voltage pattern to be applied to an electrode structure of the beam deflector of FIG. 1 for attaining a beam deflection.
Figure 4:
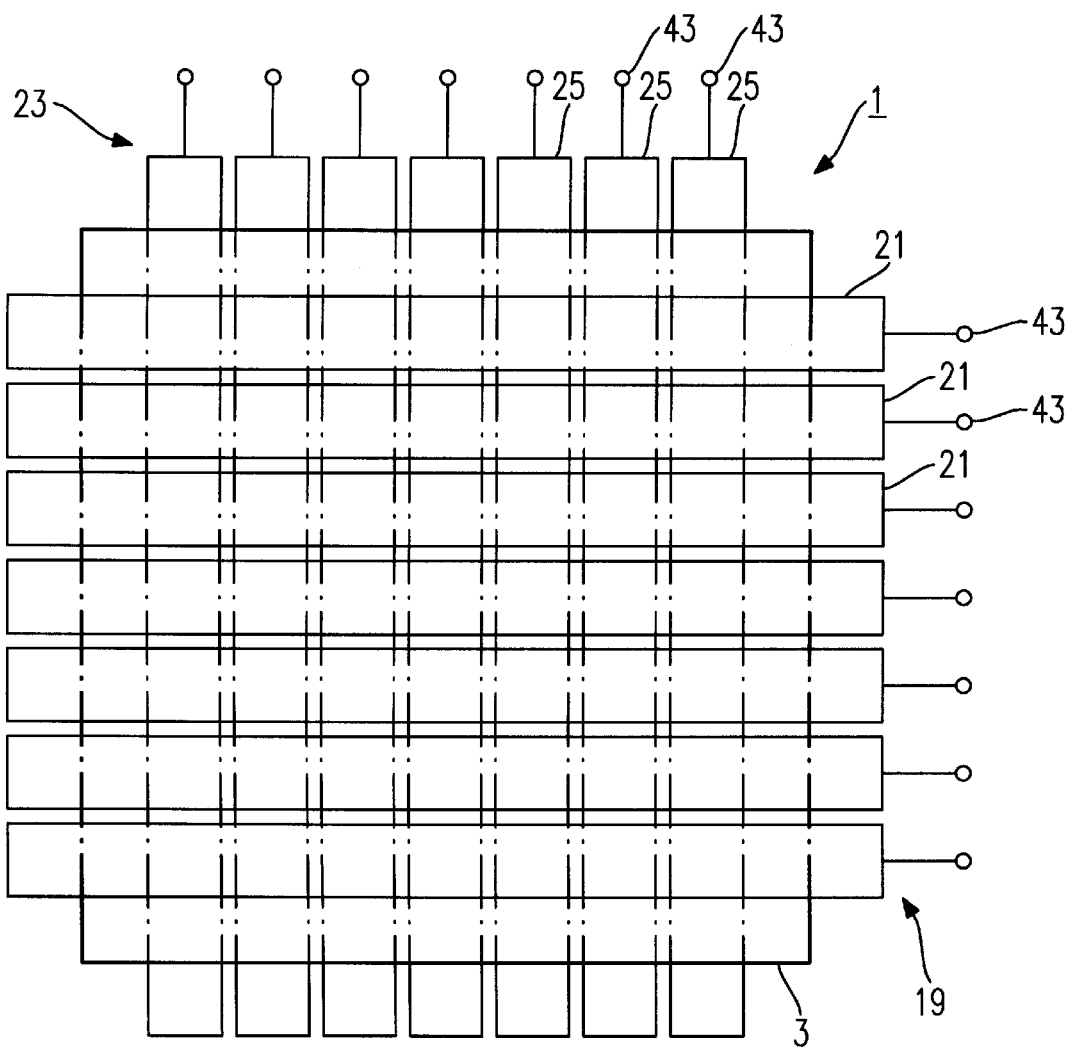
FIG. 4 is a schematic plan view of the beam deflector of FIG. 1 illustrating electrode structures for deflecting the beam in two spatial directions.

In FIG. 3, a wave front of the incident beam 9 having entered the etalon 1 is indicated by a line 27 extending parallel to the mirrors 5, 7, and a direction of propagation of the wave front 27 is indicated by an arrow 29.

An electric voltage pattern is applied to the electrode structure 23 through the stripe electrodes 23, said pattern having, position-dependent, a sawtooth shape in an x-direction transverse to the direction of extension of the stripe electrodes 25. In response to the voltages applied, a position-dependent change of the refractive index is produced in the electro-optical medium 3, which is thus likewise of sawtooth shape in x-direction. Here, a difference between the lowest voltage 0 applied to the electrodes 25 and the highest voltage $U_{max}$ applied to the electrodes is selected such that the corresponding change of the refractive index n of the electro-optical material causes a phase shift of the reflected beam 17 of almost $2\pi$. Accordingly, the wave front 27 which was initially oriented in mirror direction adjusts itself obliquely in the resonator, as it is indicated in FIG. 3 by lines 31, a phase jump of $2\pi$ occurring from one line 31 to the next one. As a result of the tilt of the wave fronts 31, the direction of propagation of the wave in the resonator 3 no longer extends orthogonally to the mirror surfaces 5 and 7, but likewise obliquely thereto, as it is indicated by arrows 33 in FIG. 3. The direction of the beam 17 emerging from the beam deflector 1 is then accordingly deflected in x-direction relative to the direction of the incident beam 9.

As it is evident from the above description, the etalon 1 constitutes a phase grating for the incident beam 9 which, when the applied voltages exhibit, position-dependent, the sawtooth shape, constitutes a "blazed" phase grating which enables light to be deflected in well-aimed manner into predetermined spatial directions.

If voltages are now applied, position-dependent, to the stripe electrodes 21 of the electrode arrangement 19 as well, it is possible to deflect the beam also in Y-direction.

FIG. 3 also indicates a distance b, along which the beam deflector 1 provides a phase shift of $2\pi$. In the drive mode reflected by FIG. 3, said length b corresponds to the width of 6 stripe electrodes 25. The shortest length b attainable with this beam deflector 1 corresponds to double the distance between two stripe electrodes 25 if the electrode arrangement 23 is driven such that the voltages 0 and Umax are alternately applied to respective adjacent stripe electrodes. It is now conceivable, by reduction of the distance between adjacent stripe electrodes 25, to also reduce the minimum distance b and to thus provide a phase grating having a still higher grating period and, as a result, higher maximum deflection angles, which would be possible in the described embodiment in terms of manufacturing engineering. However, a guided and targeted deflection of the incident beam 9 is attained with high quality if a minimum value b realized by the drive mode is higher than $$\lambda * \sqrt{\left(\frac{5}{2} * \frac{1}{(n*\Delta n)}\right)}$$

In order to obtain a more profound understanding of the operation of the electrode arrangements 19 and 23, reference can be taken to U.S. Pat. No. 4,639,091, the full disclosure of which is incorporated herein by reference.

The beam deflector illustrated in FIG. 1 can be manufactured, for example, in that the plate 3 is cut from a lithium niobate monocrystal in suitable manner and then, first, the mirrors 5 and 7 are laminated on the respective sides of the plate by vapor deposition and, finally, the electrode arrangements 19 and 23 are attached on the mirrors 5 and 7, respectively.

Figure 5:
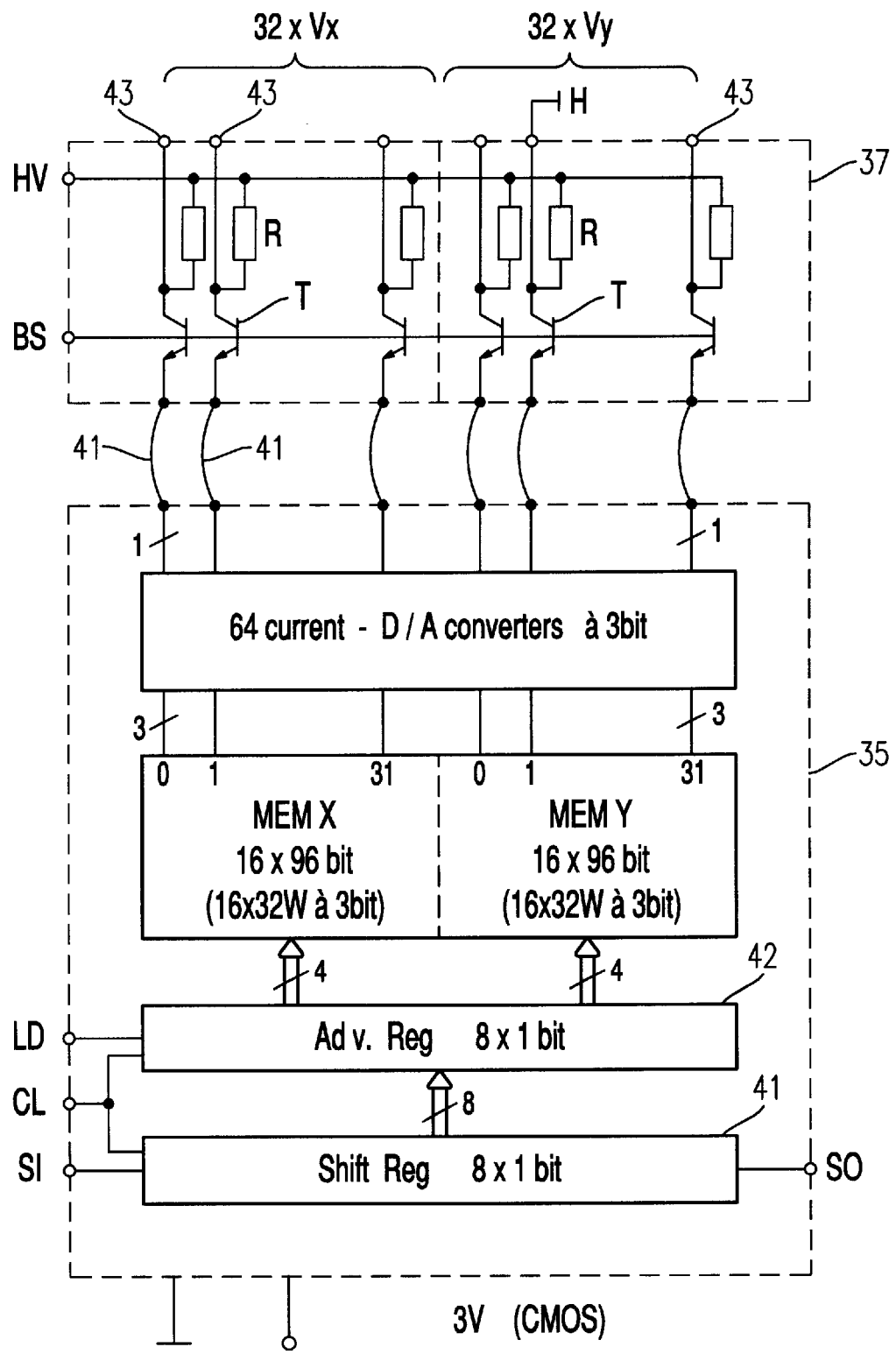
FIG. 5 is a schematic representation of a circuit for applying voltages to the electrodes of the beam deflector of FIG. 1.

FIG. 5 is a schematic representation of an electronic circuit suitable for applying voltage patterns to two electrode arrangements, each including 32 stripe electrodes, in order to deflect an incident light beam 9 in x-direction as well as in y-direction into 32 different spatial directions. The circuit comprises a low-voltage part 35, laid out, for example, in CMOS technology, as well as a high-voltage part 37. Data words, each encoding a desired deflection direction, are serially read-in, via an input SI, into a shift register 41 and transferred in parallel from the same to an address register 42, a clock input CL and a load command input LD being, in addition, provided for this purpose. Furthermore, the circuit comprises two memories designated MEMX and MEMY in which voltage patterns for voltages to be applied to the stripe electrodes 25 and 21 are stored in order for a beam deflection into the desired spatial directions to be performed. The encoding of the words read-in into the shift register 41 is selected such that it can be directly used via the address register 42 to respectively address the corresponding voltage pattern in the memories MEMX and MEMY. The addressed voltage patterns are then supplied from the memories MEMX and MEMY to 64 digital-to-analog current converters which supply, allocated to each electrode 21, 25, a current via lines 41 connected to the high-voltage part 37 where the supplied currents are respectively converted into a corresponding high voltage between 0 and 400 volt by means of transistors T and resistors R and then supplied to terminals 43 for the respective stripe electrodes 21, 25.

Further, in FIG. 5, reference sign BS designates a bias voltage for the transistors and reference sign HV designates a terminal for supplying the high-voltage.

The beam deflector described above can be employed, for example, in a switching system for selectively coupling a plurality of inputs and outputs for optical signals which are, for example, input and output via light conductors. An example of a switching system for selectively coupling optical fibers employing a conventional beam deflector is disclosed in U.S. Pat. No. 5,963,682, the full disclosure of which is incorporated herein by reference.

Figure 6:
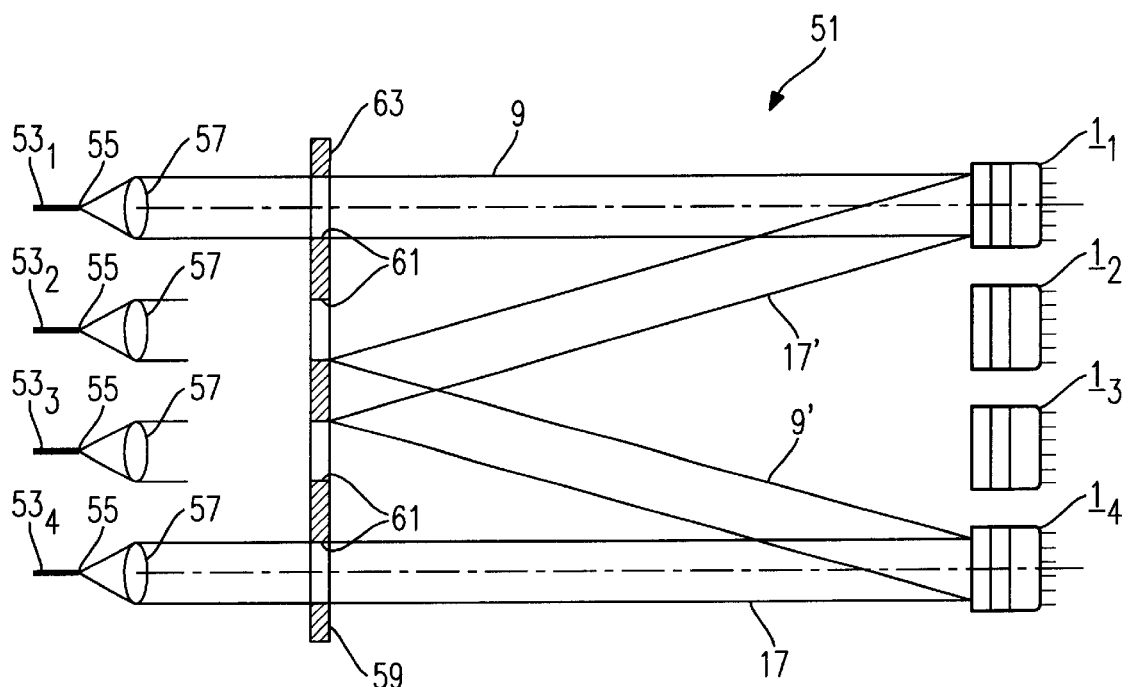
FIG. 6 illustrates an embodiment of a switching system according to the invention for selectively coupling terminals for optical signals.
Figure 7:
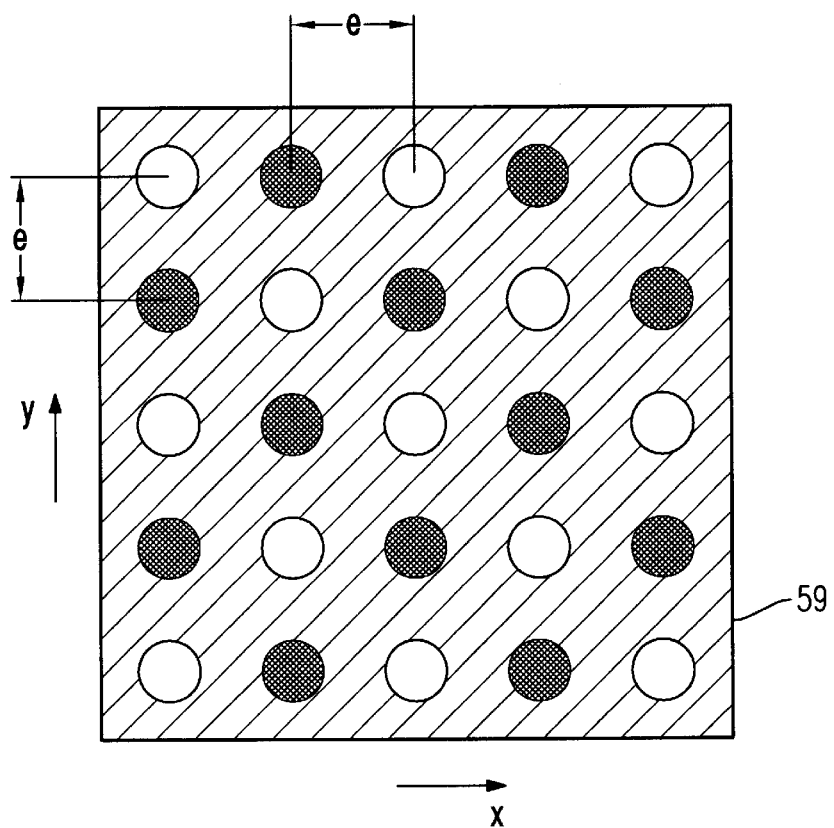
FIG. 7 is an illustrative detailed representation of the switching system of FIG. 6.

FIGS. 6 and 7 schematically show partial views of a embodiment of the switching system 51 according to the invention. A plurality of optical fibers 53-1, 53-2, 53-3, 53-4 constitute the terminals for optical signals of the switching system 51, wherein terminal ends 55 of the fibers 53 are arranged as a two-dimensional field with equal grating distance e in x-direction and y-direction. To this end, a support for the fiber ends is provided, which is not shown in the drawings, said support also holding a plurality of collimator lenses 57 such that a lens 57 is positioned in front of each fiber end 55 in order for the light emerging from the fiber end 55 to be collimated as parallel beam 9 and, respectively, to feed a parallel beam 17 impinging on the lens 57 into the corresponding fiber 53.

A separate beam deflector 1-1, 1-2, 1-3, 1-4 is allocated to each terminal 53-1, 53-2, 53-3, 53-4 such that a field of beam deflectors 1 is positioned spaced apart from the fiber ends 55 such that beams 9 exiting from the fiber ends 55 impinge directly on a beam deflector 1 allocated to the same.

A plate 59 is disposed between the field of fiber ends 55 and collimator lenses 57 and the field of deflectors 1 perpendicular to the beam direction and comprises holes 61 likewise spaced apart from each other by the distance e for the beams 9, 17 to pass therethrough. A surface 63 of the plate 69 facing towards the field of beam deflectors 1 is mirrored.

FIG. 6 illustrates a switch situation of the switching system 51, wherein the upper optical terminal 53-1 of the Figure is coupled, as input, with the lower optical terminal 53-4 of the Figure, as output. To this end, the electrode structure of the upper beam deflector 1-1 of FIG. 6 is driven such that the beam 9 emerging from the optical input 53-1 is reflected, as beam 17', through such an angle that the reflected beam 17' impinges on the mirrored surface 63 of the plate 59 such that it is, in turn, reflected as beam 9' by the same and impinges on the lower beam deflector 1-4 of FIG. 6 which is allocated to the optical output 53-4. The lower beam deflector 1-4 is driven here such that the beam 9' incident thereupon is reflected into the beam 17 which is fed into the optical output 53-4. Thus, the fiber 53-1 is, as optical input, coupled to or connected with the fiber 53-4, as optical output.

However, it is also possible to couple the fiber 53-1, as optical input, with the fiber 53-2, as optical output, in that the deflector 1-1 is driven such that the beam 17' reflected by said beam deflector is directed to the mirror surface 63 such that the beam 9' reflected by the mirror surface 63 impinges on the beam deflector 1-2 which then, in turn, is driven such that the beam 9' impinging thereon is fed into the fiber 53-2, as optical output.

It is thus possible to couple a plurality of terminals 53 of the switching system 51 in freely selectable manner in that the beam deflectors 1 allocated to the terminals to be coupled are appropriately driven.

In the embodiment shown in FIGS. 6 and 7, in operation, every second terminal 53 is provided as input and every second other optical terminal 53 is provided as output, as it is illustratively shown in FIG. 7, wherein the positions of the terminals 53 used as optical inputs are represented as black circles and the positions of the terminals 53 used as optical outputs are represented as white circles.

Figure 15:
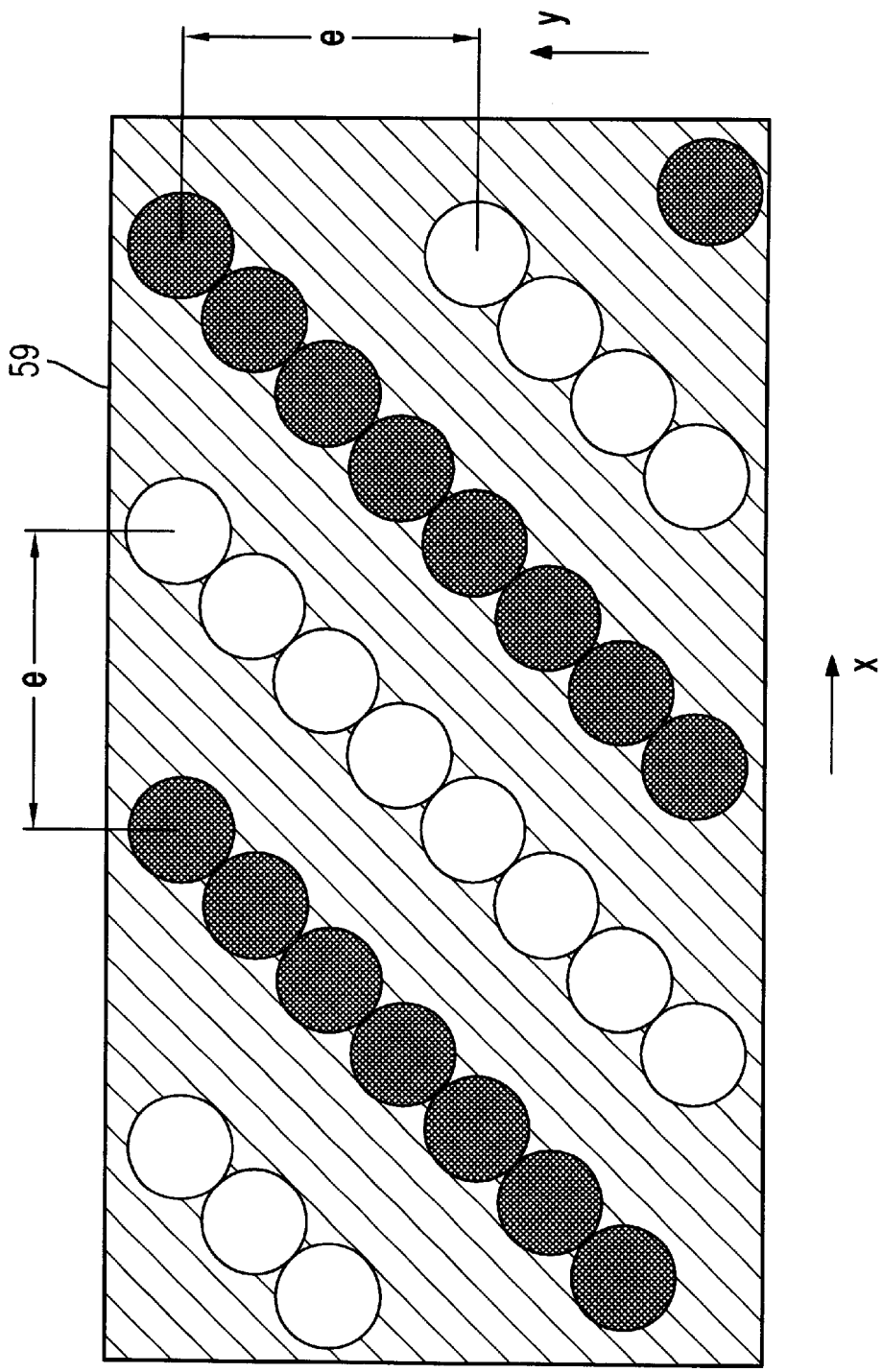
FIG. 15 illustrates a variant of the detailed representation shown in FIG. 7.

However, it is also possible to use every terminal as input or output, as required. Further, it is also possible to provide different or modified distances between adjacent terminal ends. An illustrating example is schematically shown in FIG. 15.

In the following, variants of the embodiments of the invention shown in FIGS. 1 to 7 are described. Components which are equivalent in structure and function to those of FIGS. 1 to 7 are designated by the same reference numerals, for the purpose of distinction, however, supplemented by an additional letter. For the purpose of illustration, reference is made to the entire above description.

Figure 8:
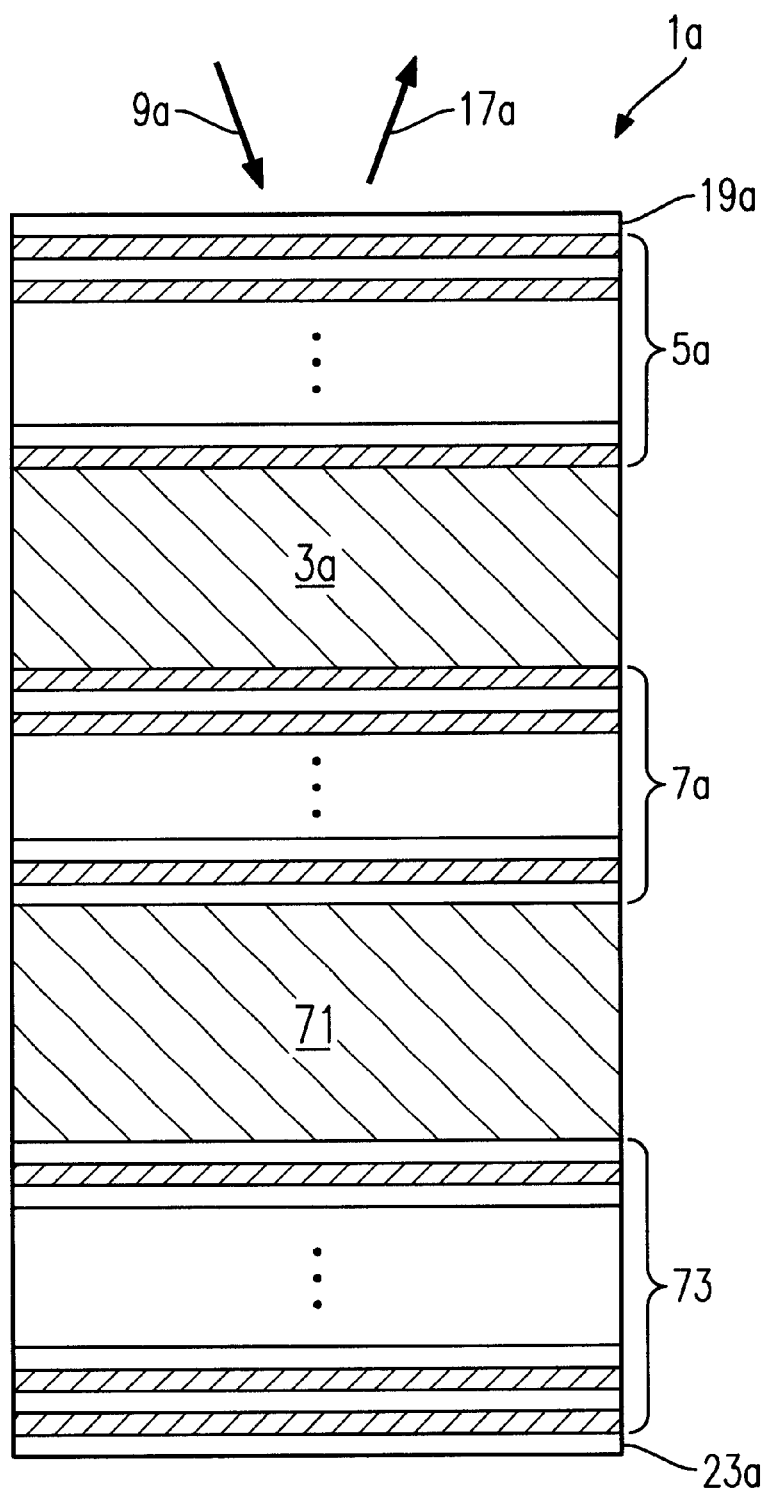
FIG. 8 is a schematic cross-sectional representation of a further embodiment of the beam deflector according to the invention.

FIG. 8 schematically shows a beam deflector 1a provided as double-resonator or double-etalon structure. Similar to the etalon shown in FIG. 1, the deflector 1a comprises a highly reflective upper mirror 5a comprised of layers of dielectric materials which faces towards an incident beam 9a. Below the mirror 5a, there is provided a plate 3a made of electro-optical material which is delimited at the bottom by a further mirror 7a which is likewise comprised of a plurality of layers of dielectric material.

Below the mirror 7a, there is a second plate 71 of electro-optical material and, below the second plate 71, there is provided a further mirror 73 likewise comprised of a plurality of layers of dielectric material having different refractive indices.

The number of layers of dielectric material of the lower mirror 73 is higher than the corresponding number of the central mirror 7a which, in turn, is higher than the number of dielectric layers of the upper mirror 5a. Accordingly, the upper plate 3a of electro-optical material is enclosed in a resonator formed by the two mirrors 5a and 7a which is of lower quality than an optical resonator formed by the mirrors 7a and 73 in which the lower plate 71 of electro-optical material is enclosed.

Figure 9:
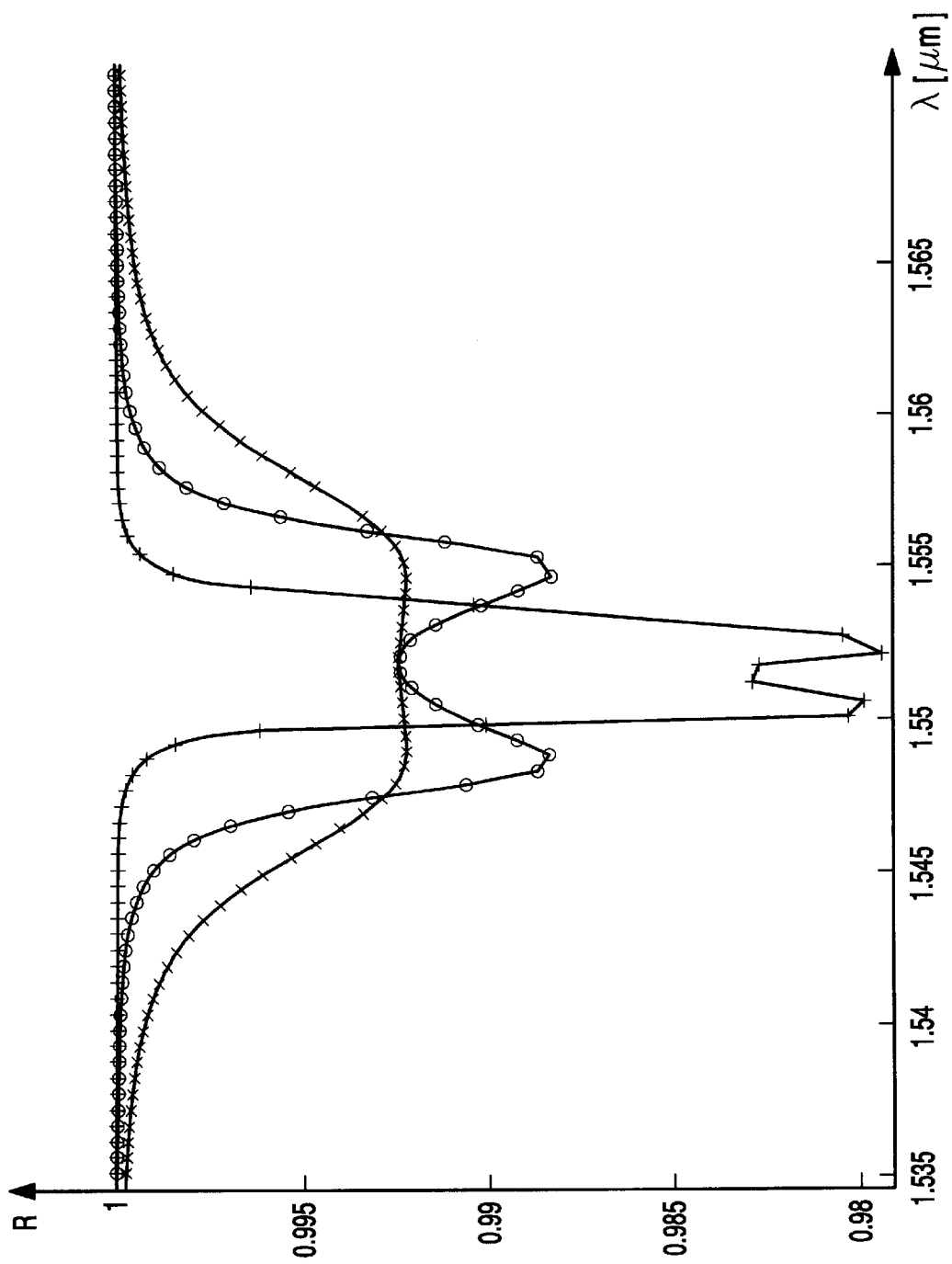
FIG. 9 shows graphical representations illustrating reflectivity curves of the beam deflector of FIG. 8 dependent upon the wavelength of the incident beam.

The entire structure consisting of the mirrors 5a, 7a and 73 as well as of the plates 3a and 71 of electro-optical material is enclosed between electrode arrangements 19a and 23a. As in the etalon structure 1a, the rear mirrors of the two resonators are also provided to have a reflectivity which is substantially higher than that of the respective front mirrors, here, too, the major part of the intensity of the incident beam 9a is reflected as beam 17a. FIG. 9 illustrates the dependency of the reflectivity of the structure shown in FIG. 8 on the wavelength $\lambda$. The curve marked by crosses reflects the curve for a structure wherein the mirror 5a is comprised of 8 layers, the mirror 7a is comprised of 12 layers and the mirror 73 is comprised of 22 layers. The curve marked by circles reflects the curve for a structure wherein the mirror 5a is comprised of 6 layers, the mirror 7a is comprised of 8 layers and the mirror 73 is comprised of 22 layers. The curve marked by the letter x reflects the curve for a structure wherein the mirror 5a is comprised of 4 layers, the mirror 7a is comprised of 6 layers and the mirror 73 is comprised of 22 layers.

It was found that in all mirror embodiments the reflectivity is extremely high.

Accordingly, with such a configuration, a phase shift of more than $2\pi$ can also be achieved with wavelengths which differ from the design quality $\lambda_0$, which is particularly of importance with a view to the deflection of the beam in two spatial directions.

Figure 10:
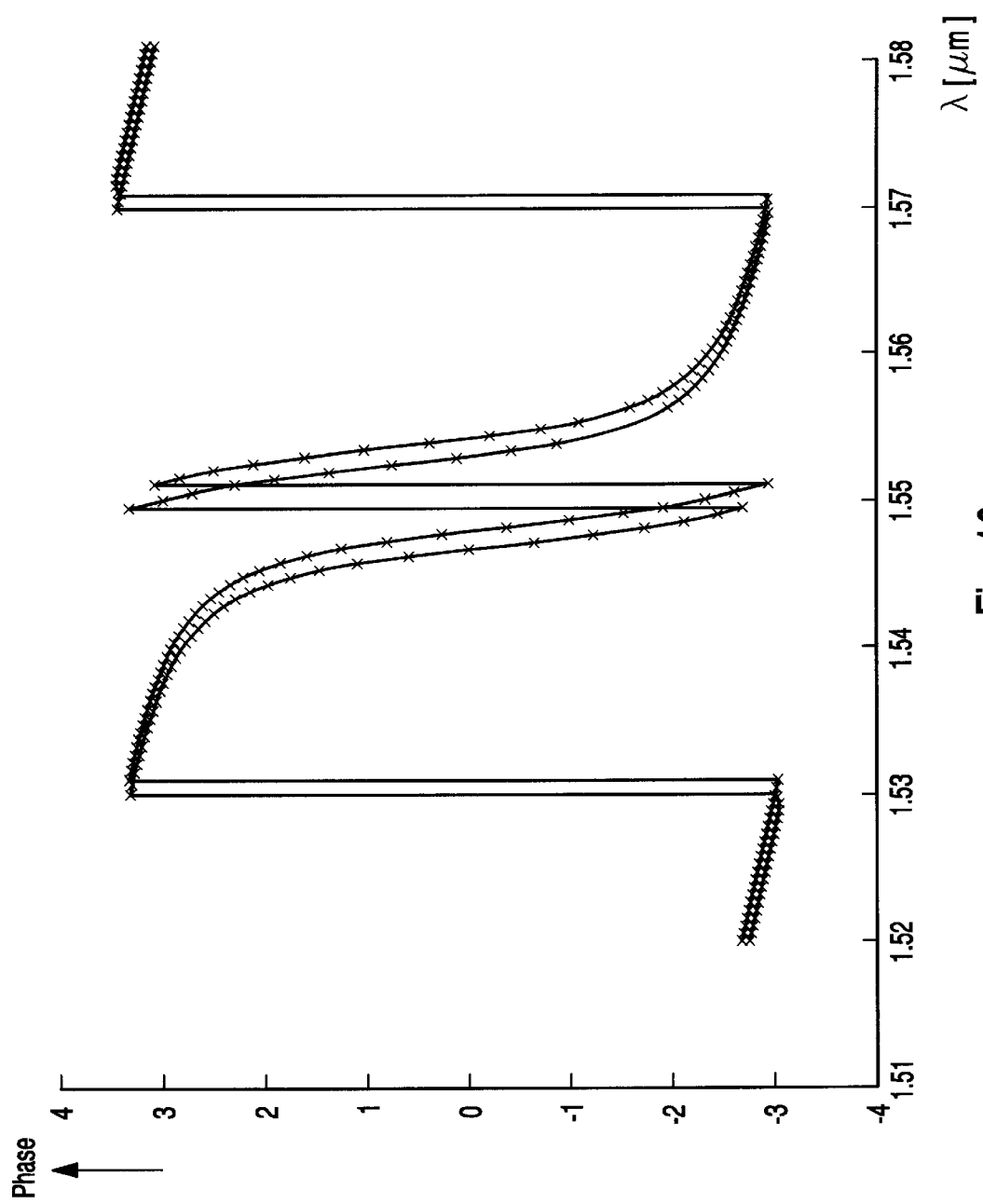
FIG. 10 shows graphical representations illustrating phase curves of the beam reflected at the beam deflector of FIG. 8 dependent upon the wavelength of the incident beam.

FIG. 10 is a representation corresponding to that of FIG. 2 of the phase difference between incident and exiting beam for the etalon structure of FIG. 8, the mirrors 5a, 7a and 73 being comprised of 6, 8 and 22 layers, respectively, the thickness of the plates 3a and 71 being 14.5$\lambda$ and 10.5$\lambda$, respectively.

The main difference between the etalon of FIG. 1 and FIG. 8 resides in that, in the beam deflector 1a of FIG. 8, both resonators can each contribute to the entire phase difference with a maximum phase difference of $2\pi$, so that phase differences of $4\pi$ can very easily be attained with this double-resonator configuration.

The structure 1a shown in FIG. 8 can, for example, be manufacture in that, first, the electrode arrangement 23a is deposited on a substrate (not shown in the Figure) and, next, the layers of the mirror 73 are vapor-deposited thereon. After the mirror 73 has been finished, the plate 71 of electro-optical material, such as lithium niobate, may be grown thereon by means of MOCVD (metal organic chemical vapor deposition). Subsequently, the mirror 7a is vapor-deposited and, next, the plate 3a of lithium niobate is grown by means of MOCVD. Next, the mirror 5a is vapor-deposited and, finally, the upper electrode arrangement 19a is applied.

By means of MOCVD a plurality of electro-optical materials can be deposited with sufficient precision and required material structure in order for the optical effects required for the present invention to be attained. For further details of the MOCVD technique, reference is made to the article of Ren Xu "The Challenge of Precursor Compounds in the MOCVD of Oxides" from http://www.tms.org/pubs/journals/JOM/9710/Xu of Jan. 16, 2001, the disclosure of which is also incorporated herein by reference.

The double-resonator 1a, the phase curve of which is shown in FIG. 10, is configured for a design quality $\lambda_0$ of 1.55 $\mu$m, the operating point at the design quality being positioned in the area of the phase jump shown in FIG. 10.

Figure 11:
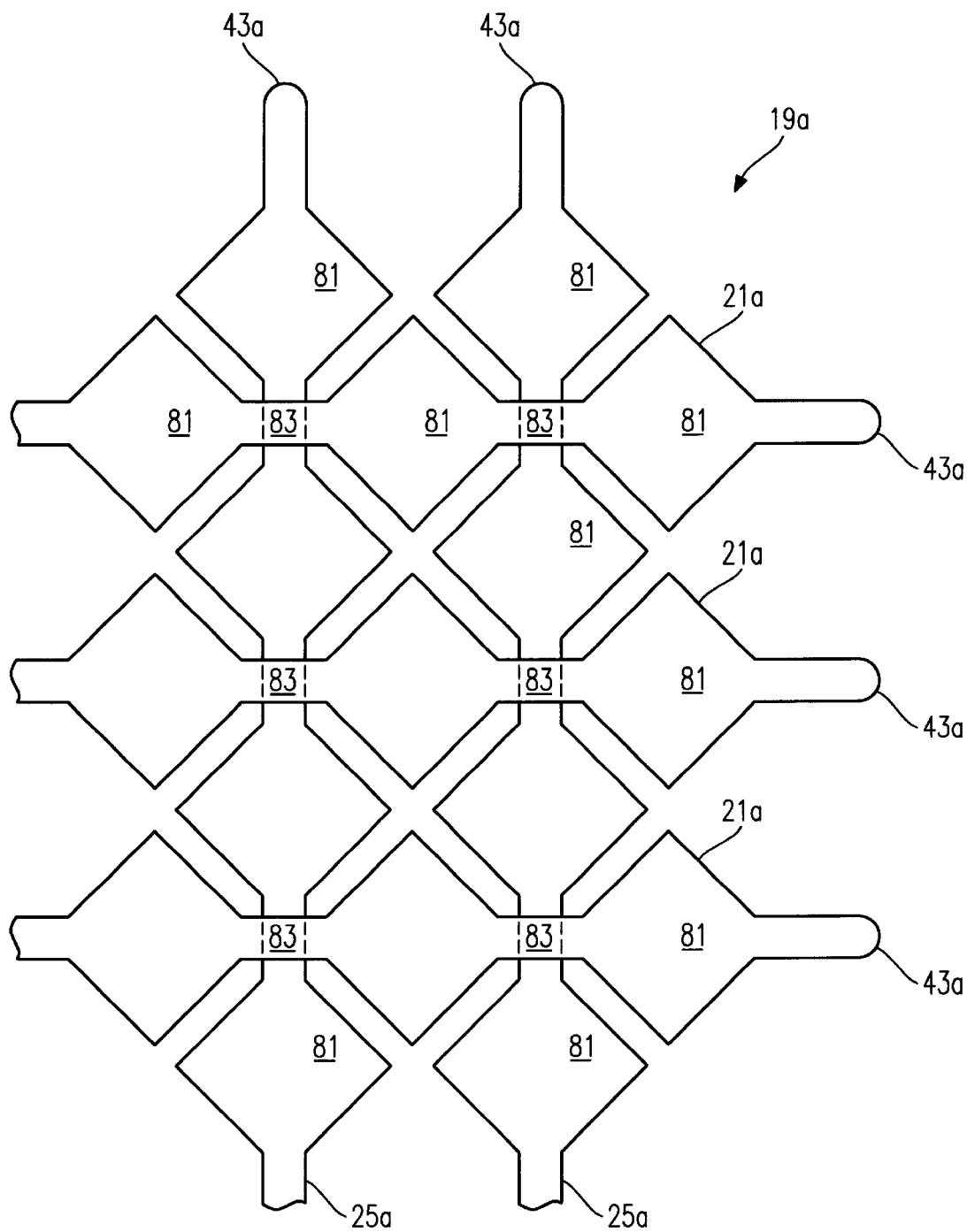
FIG. 11 illustrates an embodiment of an electrode structure according to the invention for a beam deflector.

FIG. 11 illustrates a variant of the upper electrode arrangement 19a for a beam deflector of the invention. Here, the electrode arrangement 19a is not only comprised of stripe electrodes which extend in parallel only in one direction. Much rather, the electrode arrangement comprises two sets of stripe electrodes, one set thereof extending, with stripe electrodes 21a, in horizontal direction in FIG. 11 and a second set of stripe electrodes extending, with strip electrodes 25a, in vertical direction in FIG. 11.

If, for example, an electrode arrangement 19a of the type shown in FIG. 11 is disposed, for example, on the top of the beam deflector of FIG. 1, it suffices to correspondingly provide the electrode arrangement 23 on the bottom of the beam deflector as continuous and uninterrupted earth electrode. Nevertheless, the reflected beam can be deflected into two spatial directions. This configuration of the electrode arrangement 19a is advantageous in that merely one of the two electrode arrangements must be provided in structured manner.

In order to avoid an overlap of the electrodes provided as intersecting stripes, the stripes 21a, 25a comprise in length direction, alternately, wide surface areas 81 and narrow surface areas 81, with intersecting stripes overlapping each other merely in narrow surface areas 83. The wide surface areas 81 are substantially surface-covering and non-overlapping so that the electric potentials applied thereto can act on the dielectro-optical materials. The intersecting areas 83 of the stripes 21a and 25a, respectively, are electrically insulated from each other. This can be achieved in that the first partial electrode set with the stripes 25a is applied by means of a thin-film technique, an insulating layer is applied thereon and the other partial electrode set with stripe electrodes 21a is disposed thereon.

However, it is also conceivable to provide the stripe electrodes 21a of the partial electrode set disposed remote from the electro-optical material as stripes of approximately uniform width, because the effect of these electrodes on the electro-optical material in the areas where these stripes 21a overlap the stripes 25a therebelow is shielded by the stripes 25a positioned therebelow, so that effective areas of the continuously wide outer stripe electrodes exhibit a configuration approximately similar to that of the wide areas 81 shown in FIG. 11.

Figure 12:
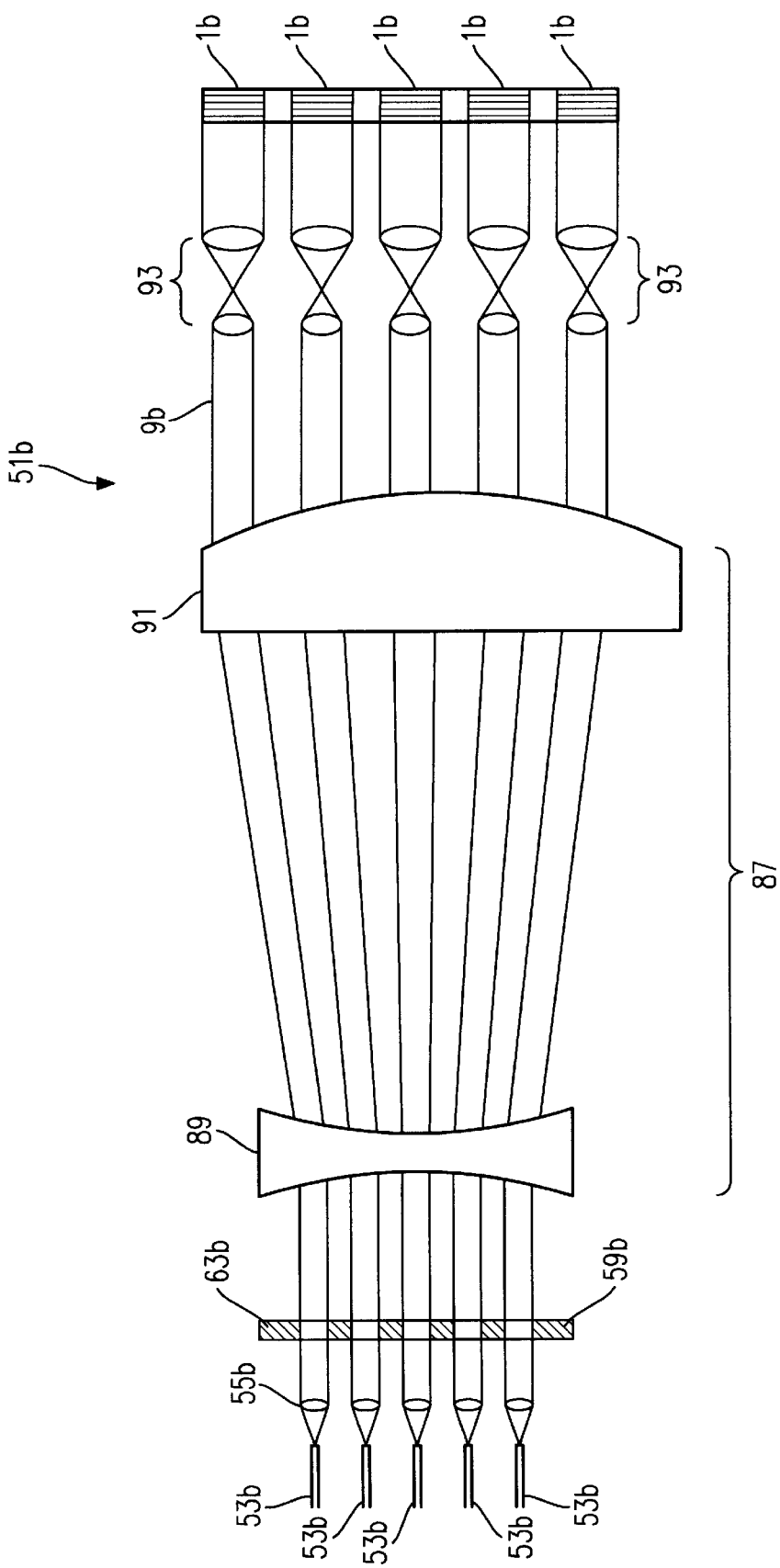
FIG. 12 illustrates a further embodiment of a switching system according to the invention.

A switching system 51b shown in FIG. 12 for selectively coupling optical inputs 53b has a structure which is similar to that shown in FIG. 6. In contrast thereto, a common telescope 87, which is schematically depicted in the form of a diverging lens 89 and a collective lens 91, is positioned between a field of beam deflectors 1b and a plate 59b comprising a mirrored side 63b. All beams extending between the terminals 53b and the beam deflectors 1b pass through the collective lens 91 as well as through the diverging lens 89. The telescope 87 substantially serves to reduce the overall length of the switching system 51b as compared to the overall length which must be selected for the switching system according to FIG. 6 at a predetermined maximum deflection angle of the beam deflectors.

Moreover, the switching system 51b comprises a plurality of individual telescopes 93 such that an individual telescope 93 is positioned in front of each beam deflector 1b for adjusting a beam 9b collimated by a lens 55b in front of the exit end of the fiber ends 53b to the diameter which substantially fully illuminates the effective area of the beam deflector 1b.

It is also evident from FIG. 12 that a distance between adjacent fiber ends 53b is smaller than a distance between adjacent beam deflectors 1b. Although it would be possible, in terms of manufacturing engineering, to further reduce the distance between adjacent beam deflectors 1b, the individual beam deflectors 1b are so configured that the above-mentioned lower limit for the distance in the electro-optical material along which a phase shift of $2\pi$ is produced is maintained.

The switching system 51b shown in FIG. 12 can be modified in that both the large telescope 87 or/and the individual telescopes 93 can be omitted so that these components are, as such, optional.

Figure 13:
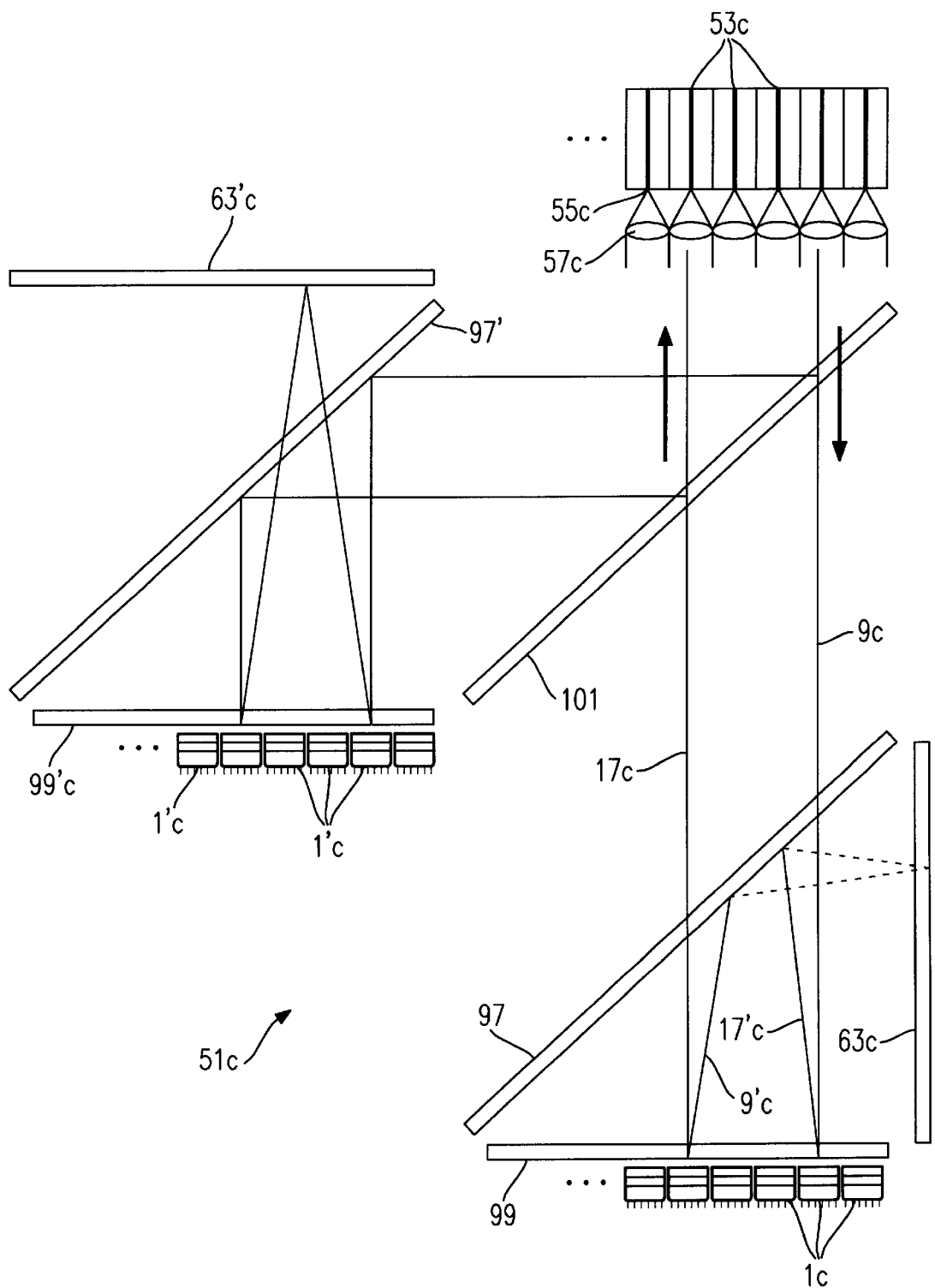
FIG. 13 illustrates a still further embodiment of a switching system according to the invention.

A switching system 51c shown in FIG. 13 again serves to selectively couple a plurality of optical inputs and outputs 53c by means of a plurality of beam deflectors 1c, each of which is allocated separately to an optical terminal 53c. Collimator lenses 57c respectively collimate the beams emerging from fiber ends 55c onto the beam deflectors 1c. Similar to the embodiment of FIG. 6, an incident beam 9c reflected by a beam deflector 1c is reflected into a beam 17'c which is reflected from a mirror 63c as beam 9'c onto the beam deflector 1c which is allocated to the desired exit terminal. However, the mirror 63c reflecting the beam 17'c back into the beam 9'c is not provided at an apertured plate, as in FIG. 6. Rather, the mirror 63c is positioned outside of the beam path between the collimator lenses 57c and the beam deflectors 1c. For this purpose, a semi-transparent feed-out mirror 97 is provided. The beams 9c and 17c pass through said feed-out mirror 97 between the collimator lenses 57c and the beam deflector 1c. As a result, the feed-out mirror 97 has a polarizing effect on theses beams and only the polarized parts of the beams 9c and 17c transmitted through the mirror 97 are then reflected, after a polarization rotation at a λ-quarter-plate 99, by the mirror 97 onto the mirror 63 positioned outside of the beam path.

As the feed-out of the beams to be reflected at the mirror 63c by means of the polarizing mirror 97 entails a loss of half the intensity (due to the polarizing effect), a further polarizing beam divider 101 is provided between the collimator lenses 57c and the mirror 97 in order to feed-out the polarization part which would get lost at the mirror 97 and to direct the same to a further field of beam deflectors 1'c. These beam deflectors are driven such that they couple the same optical inputs and outputs 53c with each other which are also coupled with each other via the beam deflectors 1c. To this end, the beam deflectors 1'c reflect the beams incident thereupon to a mirror 63'c which corresponds to the mirror 63c. Equally, an inclined, semi-transparent and likewise polarizing mirror 97' is positioned between the mirror 63'c and the beam deflector 1'c which corresponds to the mirror 97, just as a λ-quarter-plate 99' is positioned in front of the beam deflectors 1c'.

In all, the switching system 51c' is configured such that the optical wavelengths for both polarization direction are substantially of equal length so that also short optical pulses which are separated into their two polarization directions via the mirror 101 are, after deflection at the beam deflectors 1c and 1'c, respectively, recombined at the mirror 101 substantially correct in time.

In the above-described embodiments, lithium niobate has been used as electro-optical material. However, it is also possible to use gallium arsenide (GaAs) as electro-optical material, for which a refractive index n=3.5 is assumed. It is then recommended for the dielectric layers of the resonator mirror to be alternately comprised of aluminium arsenide (AlAs), for which a refractive index $N_L$=3.0 is assumed, and gallium arsenide ($n_H$=3.5). Gallium arsenide, too, exhibits an electro-optical effect, i.e., a change of the refractive index in response to an applied electric field. In this respect, the intensifying effect of the electro-optical effect can be utilized by use of so-called "quantum well" structures in the gallium arsenide. This technology is described in U.S. Pat. No. 4,525,687, the full disclosure of which is in this respect incorporated by reference.

The use of semi-conductors as materials for the plate of electro-optical material is advantageous in particular also in so far as, in such semi-conductor materials, physical effects, such as the "quantum confined stark effect" and the "Franz-Keldisch effect", can be utilized to increase the electro-optical effect.

In the above-described embodiments, the electrode arrangements engage around both the plates of electro-optical material and the mirrors made of layers of dielectric material. However, it is also conceivable to arrange the electrode arrangements between the plate of electro-optical material and the layered mirrors. This enables, on the one hand, a smaller electrode distance to be attained with a view to an increase of the electric field strength. On the other hand, leak currents can be avoided which might be produced in the mirror layers. In order to reduce absorption losses at the electrode arrangements, the latter can then be arranged in the resonator such that they are spaced apart from the resonator mirrors such that they are positioned in oscillation knots of the light field.

Figure 14A:
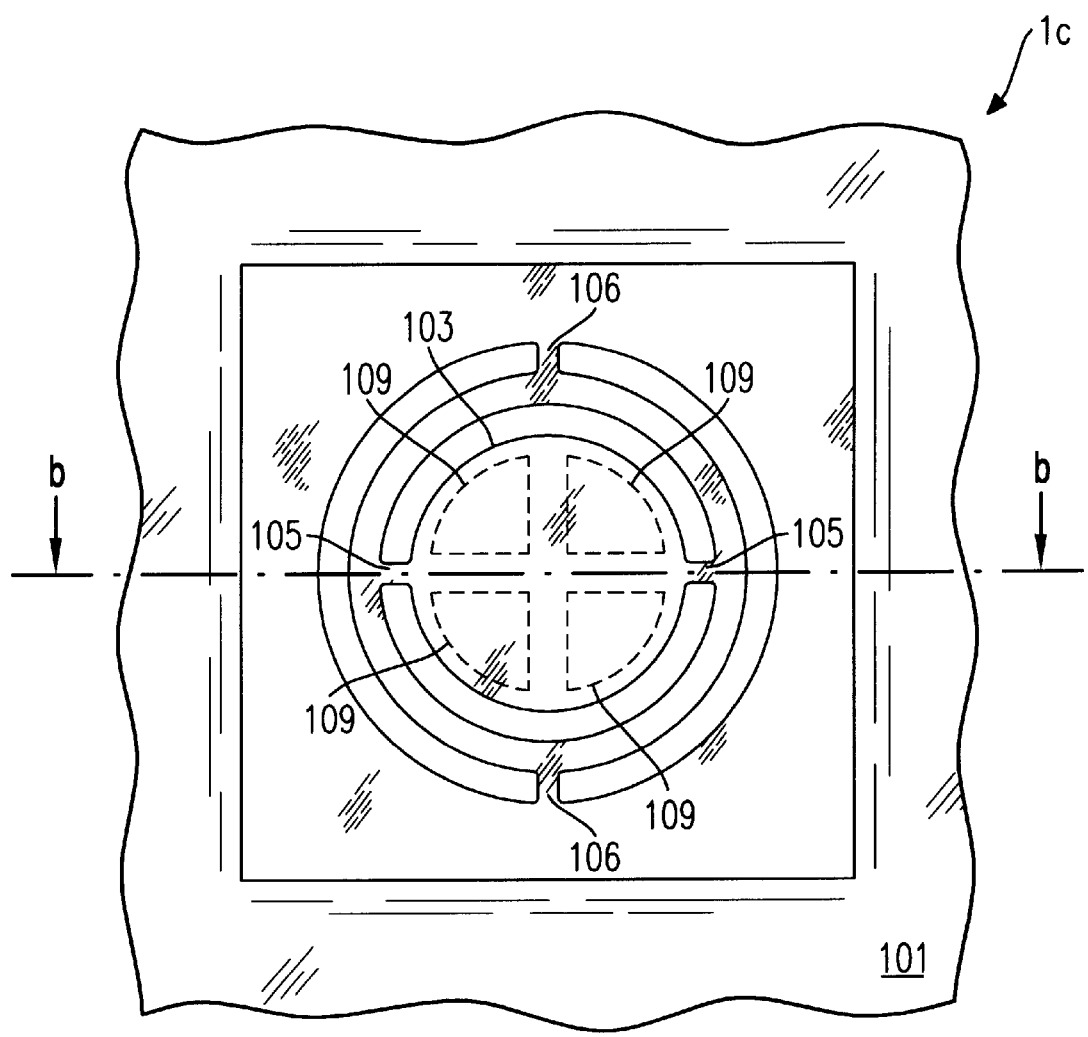
FIG. 14 illustrates a variant of a beam deflector to be employed in the switching system according to FIGS. 12 and 13.
Figure 14B:
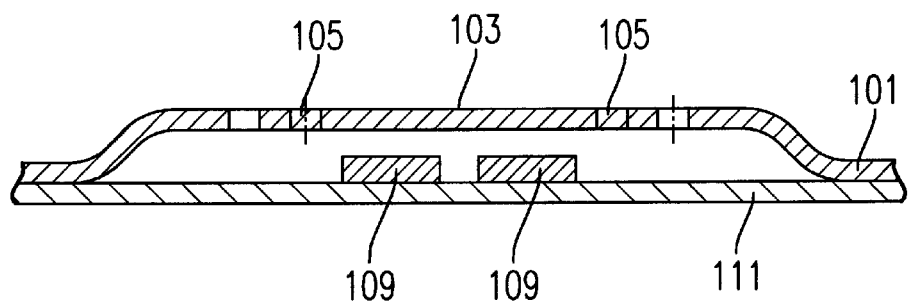

In the embodiments described above with reference to FIGS. 12 and 13, the structure of the beam deflectors is that described with reference to FIGS. 1 to 11. However, it is also possible to provide the optical switching systems shown in FIGS. 12 and 13 with beam deflectors, each comprising a mirror which is mechanically pivotable in respect of a mirror support. Such beam deflectors can be manufactured in miniaturized form and are described, for example, in the article of James A. Walter "The future of MEMS in telecommunications networks", Journal Michromech. Microeng. 10 (200) R1–R7/PII: S0960-1317(00)06735-8. FIG. 14 schematically shows a beam deflector 1c provided as so-called MEM mirror. A circular mirror surface 103 is punched out of a plate material 101, with pairs of hinges 105 and 106 which are diametrically opposed in respect of the mirror surface respectively supporting the mirror surface 103 cardanically relative to the remaining plate material 101. Below the mirror surface 103, there are provided four sectors of drive electrodes 109 on an electrode support 111 spaced apart from the rear side of the mirror by a little distance, said electrode support being fixedly connected to the plate material holding the mirror surface 103. By applying appropriately dimensioned electric voltages to the sector electrodes 109, an electrostatic field is produced between the mirror 103 and the electrodes, said field imparting mechanical shift forces on the mirror surface 103 so that the latter is pivoted about the hinge webs 105 and 106, respectively, in order for the mirror surface 103 to be inclined in respect of its support and to set a desired deflection angle for incident light beams.

What is claimed is:

1. A beam deflector for deflecting an incident beam of light of a predetermined wavelength (λ), comprising a first plate of electro-optical material disposed between a pair of electrode arrangements and a pair of plano-parallel mirrors, the refractive index of the electro-optical material being variable by the application of electric voltages to the electrode arrangements, wherein a first mirror of the pair of mirrors facing towards the incident light beam has a lower reflectivity than the second mirror of the pair of mirrors, wherein at least one of the first and the second mirror comprises a plurality of layers of dielectric material, wherein the refractive indices of the dielectric materials of adjacent layers differ from each other, and wherein the incident beam is deflected in a selectable direction.

2. The beam deflector according to claim 1, wherein several layers each have a layer thickness which corresponds substantially to a value (d) which satisfies the formula d=λ/4, wherein λ is the wavelength of the incident beam in the dielectric material of the layer.

3. The beam deflector according to claim 2, wherein the first plate of the electro-optical material has a thickness which corresponds substantially to a value D which satisfies one of the two formulae D=K/2*λ and D=(2k−1)/4*λ, wherein X is the wavelength of the incident beam in the electrio-optical material and k is a natural number of more than 0.

4. The beam deflector according to claim 1, wherein two different dielectric materials are used for the mirror surfaces which are alternately laminated onto each other.

5. The beam deflector according to claim 1, wherein the second mirror is substantially fully reflective and a residual transmissivity of the second mirror is at most one tenth of a residual transmissivity of the first mirror.

6. The beam deflector according to claim 1, wherein the second mirror comprises at least six, in particular, at least eight layers.

7. The beam deflector according to claim 1, wherein the second mirror comprises at least twenty layers.

8. The beam deflector according to claim 1, wherein a second plate of electro-optical material is provided which is disposed between the second mirror and a third mirror which is plano-parallel in respect of the second mirror.

9. The beam deflector according to claim 8, wherein the third mirror has a higher reflectivity than the second mirror.

10. The beam deflector according to claim 8, wherein the third mirror comprises a plurality of layers of dielectric materials, and refractive indices of the dielectric materials of adjacent layers are different from each other.

11. The beam deflector according to claim 10, wherein the third mirror comprises at least twenty layers.

12. The beam deflector according to claim 8, wherein the second plate of electro-optical material has a thickness which corresponds substantially to a value D which satisfies one of the two formulae D=k/2*λ, wherein λ is the wavelength of the incident beam in the electric material of the second plate and k is a natural number of more than 0.

13. The beam deflector according to claim 8, wherein the first and the second plate of electro-optical material are commonly disposed between the pair of electrode arrangements.

14. The beam deflector according to claim 1, wherein the beam deflector is provided for deflecting light of a wavelength (λ) which is in a wavelength range of from 0.5 μm to 3.0 μm, preferably 1.0 μm to 2.0 μm and particularly preferred 1.3 μm to 1.7 μm.

15. The beam deflector according to claim 1, wherein the electro-optical material is an electro-optical solid material, in particular at least one of lithium niobate ($LiNbO_3$), gallium arsenide (GaAs) and a liquid crystal.

16. The beam deflector according to claim 1, wherein the dielectric material comprises at least one of silicon dioxide ($SiO_2$), titanium oxide (TiO), gallium arsenide (GaAs), aluminium arsenide (AlAs) and alumium gallium arsenide (AlGaAs).

17. The beam deflector according to claim 1, wherein each of the electrode arrangements comprises a plurality of parallel, juxtaposed stripe electrodes wherein directions of extension of the stripes of the two electrode arrangements extend transversely, in particular orthogonally, to each other.

18. A beam deflector for deflecting an incident beam of light comprising a first plate of electro-optical material disposed between a pair of electrode arrangements and a pair of plano-parallel mirrors, the refractive index of said electro-optical material being variable by the application of electric voltages to the electrode arrangements wherein a first one of the two electrode arrangements comprises two sets of stripe electrodes, the stripe electrodes of each set of stripe electrodes being juxtaposed in parallel to each other and directions of extension of the stripe electrodes of different sets of stripe electrodes extend transversely, in particular orthogonally, to each other.

19. The beam deflector according to claim 18, wherein each stripe electrode comprises—viewed in the mirror plane—along its length in the direction of extension a plurality of, alternately, wide areas and narrow areas such that the stripe electrodes of different stripe electrode sets intersectingly overlap the narrow areas.

20. The beam deflector according to claim 19, wherein the wide areas of the stripe electrodes of different stripe electrode sets are disposed such that they substantially do not overlap.

21. The beam deflector according to claim 18, wherein the second electrode arrangement of the pair of electrode arrangements is a ground electrode disposed opposite to the stripe electrodes.

* * * * *

UNITED STATES PATENT AND TRADEMARK OFFICE
CERTIFICATE OF CORRECTION

PATENT NO. : 6,643,054 B1　　　　　　　　　　　　　　　　　　　　Page 1 of 1
DATED : November 4, 2003
INVENTOR(S) : Kai Weidlich It is certified that error appears in the above-identified patent and that said Letters Patent is hereby corrected as shown below:

Title page,
Item [73], Assignee, insert -- trading as Carl Zeiss -- after "Carl-Zeiss-Stiftung".
Item [56], References Cited, U.S. PATENT DOCUMENTS,
-- 6,097,859　　08/01/2000　　Solgaard et al.　385/17
　5,943,159　　08/24/1999　　Zhu　　　　　　359/316 --
FOREIGN PATENT DOCUMENTS
-- DT 24 42 273 A1　　03/18/1976　　Germany
　2 225 122 A　　　　05/23/1990　　Great Britain
　WO 89/01647　　　　02/23/1989　　WIPO
　DE 101 02 723 A1　08/22/2002　　Germany --
OTHER PUBLICATIONS
-- H. A. Macleod, "Thin-film Optical Filters," Adam Hilger Ltd., Bristol (1986), pages 4-8
J.A. Walker, "The Future of MEMS in Telecommunications Networks," J. Micromech. Microeng. 10 (2000) R1-R7
H. Klauk et al., "Ion-beam Deposited Ultra-thin Transparent Metal Contacts," Jackson's Electronics Research Group, Thin Solid Films, volume 366, number 1-2 (May 2000), pages 272-278 --

Signed and Sealed this

Eleventh Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,643,054 B1
DATED : November 4, 2003
INVENTOR(S) : Kai Weidlich

It is certified that error appears in the above-identified patent and that said Letters Patent is hereby corrected as shown below:

Column 2,
Line 29, please replace "transmisssivity" with -- transmissivity --.

Column 4,
Line 21, please replace "menas" with -- means --.

Column 5,
Line 13, please replace "deflector" with -- deflectors --.

Column 6,
Line 65, please replace "Silicon oxide" with -- Silicon dioxide --.

Column 7,
Line 53, please delete the word "it".

Column 8,
Line 58, please replace "Umax" with -- $U_{max}$ --.

Column 11,
Line 52, please replace "manufacture" with -- manufactured --.

Column 12,
Line 28, please replace "81" with -- 83 --.

Column 15,
Line 10, please replace "X" with -- $\lambda$ --.

Signed and Sealed this

Twenty-fifth Day of October, 2005

JON W. DUDAS
*Director of the United States Patent and Trademark Office*